United States Patent

Werner et al.

[11] Patent Number: 5,940,440
[45] Date of Patent: *Aug. 17, 1999

[54] GENERALIZED MULTIMODULUS TECHNIQUE FOR BLIND EQUALIZATION

[75] Inventors: Jean-Jacques Werner, Holmdel; Jian Yang, Cliffwood, both of N.J.

[73] Assignee: Lucent Technologies Inc., Murray Hill, N.J.

[*] Notice: This patent is subject to a terminal disclaimer.

[21] Appl. No.: 08/766,406

[22] Filed: Dec. 12, 1996

Related U.S. Application Data

[63] Continuation-in-part of application No. 08/646,404, May 7, 1996, Pat. No. 5,793,807.

[51] Int. Cl.[6] .................................................. H04L 27/01
[52] U.S. Cl. ........................ 375/231; 375/233; 364/724.2
[58] Field of Search ................................... 375/229–235, 375/261, 264, 340, 350; 329/308; 364/724.02, 724.19, 724.2

[56] References Cited

U.S. PATENT DOCUMENTS

| | | | |
|---|---|---|---|
| 4,227,152 | 10/1980 | Godard et al. | 375/13 |
| 5,793,807 | 8/1998 | Werner et al. | 375/233 |

OTHER PUBLICATIONS

Sethares, W., Rey, G.A., and Johnson, C.R., Jr., "Approaches to Blind Equalization of Signals with Multiple Modulus," Proc. 1989 Int'l Conf. on Acoustics, Speech and Signal Processing, pp. 972–975, May 1989.

Axford, R.A., Jr., Milstein, L.B., and Zeidler, J.R., "A Dual–Mode Algorithm for Blind Equalization of QAM Signals: CADAMA," Conf. Record of 29th Asilomar Conf. on Signals, Systems & Computers, pp. 172–176, Oct. 1995.

You, C., and Hong, D., "Blind Adaptive Equalization Techniques Using the Complex Multi–Layer Perceptron," Proc. IEEE Globecom 1996, pp. 1340–1344, Nov. 1996.

IEEE Transactions Communications, vol. Com–28, No. 11, Nov. 1980, "Self–recovering equalization and carrier tracking in two dimensional data communications systems," by Dominique N. Godard.

K.N. Oh and Y. O. Chin, "New Blind Equalization Techniques Based on Constant Modulus Algorithm", IEEE, May 1995, pp. 865–869.

Y. Sato, "A Method of Self–Recovering Equalization for Multilevel Amplitude–Modulation Systems," IEEE Trans. Commun., pp. 679–682, Jun. 1975.

A. Benveniste and M. Goursat, "Blind Equalizers", IEEE Trans. Commun., vol. 32, No. 8, pp. 871–883, 1984.

N.K. Jablon, "Joint Blind Equalization, Carrier Recovery, and Timing Recovery for High–Order QAM Signal Constellations", IEEE Trans. Signal Processing, vol. 40, No. 6, pp. 1383–1897, 1992.

S. Chen, S. McLaughlin, P. M. Grant and B. Mulgrew, "Multi–Stage Blind Clustering Equaliser", IEEE Trans. Commun., vol. 43, No. 2/3/4, pp. 701–705, Feb./Mar./Apr. 1995.

J. K. Tugnait, "Blind Equalization and Estimation of Digital Communication FIR Channels Using Cumulant Matching", IEEE Trans. Commun., vol. 43, No. 2/3/4 pp. 1240–1245, Feb./Mar./Apr. 1995.

J. J. Werner, "Tutorial on Carrierless AM/PM—Part I—Fundamentals and Digital CAP Transmitter", Contribution to ANSI X3T9.5 TP/PMD Working Group, Minneapolis, Jun. 23, 1992.

*Primary Examiner*—Stephen Chin
*Assistant Examiner*—Jeffrey W. Gluck
*Attorney, Agent, or Firm*—Joseph J. Opalach

[57] ABSTRACT

A generalized form of a multimodulus algorithm (GMMA) is described for use in blind equalization. A receiver uses a signal point constellation representing 256 levels. This signal space is divided into sample, or data, subsets. Cost function minimization is done with respect to each sample subset.

11 Claims, 13 Drawing Sheets

PHASE-SPLITTING FSLE

UNEQUALIZED SIGNAL CONSTELLATION

START OF MMA

MODULI FOR IN-PHASE DIMENSION

MODULI FOR QUADRATURE PHASE DIMENSION

MODULI FOR BOTH DIMENSIONS

AFTER CONVERGENCE WITH MMA

AFTER CONVERGENCE WITH 64-POINT SLICER

| MAIN CHARACTERISTICS OF THE BLIND EQUALIZATION ALGORITHMS ||||
|---|---|---|---|
| ALGORITHM | RELIABILITY | COMPLEXITY | SPEED OF CONVERGENCE |
| RCA | LOW | LOW | SECOND FASTEST |
| MMA | HIGH | MEDIUM | FASTEST |
| CMA | VERY HIGH | HIGH | SLOWEST |

FIG. 19

| VALUES OF THE CONSTANTS R, $R_1$ AND $R_2$ FOR SYMBOL LEVELS ±1, ±3, ±5, ±7, ... | | | | | | | |
|---|---|---|---|---|---|---|---|
| ALGORITHM | 4-CAP | 16-CAP | 32-CAP | 64-CAP | 128-CAP | 256-CAP | 512-CAP |
| RCA | 1 | 2.50 | 3.64 | 5.25 | 7.45 | 10.625 | 15.00 |
| MMA | 1 | 2.86 | 4.32 | 6.08 | 8.88 | 12.34 | 17.87 |
| CMA | 1.414 | 3.633 | 5.11 | 7.616 | 10.49 | 15.39 | 21.11 |
| MMA $R_1$ | -- | -- | 4.49 | -- | 9.22 | -- | 18.55 |
| MMA $R_2$ | -- | -- | 2.86 | -- | 6.08 | -- | 12.34 |

DIAGONAL SOLUTION FOR 64-CAP

TABLE 1: COST FUNCTIONS

| CF-CAP | 4-CAP | 16CAP | 64CAP | 256CAP | 1024CAP |
|---|---|---|---|---|---|
| m | 1 | 2 | 4 | 8 | 16 |
| $CF_{an}$ | 0 | 14.2 | 27.7 | 40 | 52 |

FIG. 24
MULTIPLE MODULI FOR 256-CAP

- $R_3 = 14.2$
- $w_2 = 12$
- $R_2 = 10.2$
- $w_1 = 8$
- $R_1 = 6$
- $R_1 = -6$
- $w_1 = -8$
- $R_2 = -10.2$
- $w_2 = -12$
- $R_3 = -14.2$

GENERALIZED MULTIMODULUS TECHNIQUE FOR BLIND EQUALIZATION

CROSS-REFERENCE TO RELATED APPLICATIONS

This is a continuation-in-part of application Ser. No. 08/646,404, filed May 7, 1996 now U.S. Pat. No. 5,793,807. Related subject matter is disclosed in the following co-pending, commonly assigned, U.S. patent applications of Werner et al.: Ser. No. 08/646404, filed on May 7, 1996; Ser. No. 08/717582, filed on Sep. 18, 1996; Ser. No. 08/08744908 filed on Nov. 8, 1996, and Ser. No. 08/757207, filed on Nov. 27, 1996.

BACKGROUND OF THE INVENTION

The present invention relates to communications equipment, and, more particularly, to blind equalization in a receiver.

In blind equalization, the equalizer of a receiver is converged without the use of a training signal. As known in the art, there are two techniques for blind equalization: one is referred to herein as the "reduced constellation algorithm" RCA) (e.g., see Y. Sato, "A Method of Self-Recovering Equalization for Multilevel Amplitude-Modulation Systems," *IEEE Trans. Commun.*, pp. 679–682, June 1975; and U.S. Pat. No. 4,227,152, issued Oct. 7, 1980 to Godard); and the other technique is the so-called "constant modulus algorithm" (CMA) (e.g., see D. N. Godard, "Self-Recovering Equalization and Carrier Tracking in Two-Dimensional Data Communications Systems," *IEEE Trans. Commun.*, vol. 28, no. 11, pp. 1867–1875, November 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992.) Further, the co-pending, commonly assigned, U.S. patent application of Werner et al., entitled "Blind Equalization," Ser. No. 08/646404, filed on May 7, 1996, presents an new blind equalization technique—the multimodulus algorithm (MMA)—as an alternative to the above-mentioned RCA and CMA approaches.

Unfortunately, whether using the RCA, CMA, or MMA, approaches, the ability to blindly converge the equalizer is also affected by the number of symbol levels represented in the signal point constellation. In other words, the difficulty of "opening the eye" (as this term is used in the art) increases when the number of symbol levels increases.

SUMMARY OF THE INVENTION

A blind equalization algorithm is adapted to improve performance in systems using higher numbers of symbol levels in a signal space. In particular, a cost function for adapting an equalizer is modified as a function of the region of the signal space within which the equalizer output samples fall.

In an embodiment of the invention, a receiver uses a signal point constellation representing 256 levels. This signal space is divided into sample subsets. Cost function minimization is done with respect to each sample subset for the MMA algorithm. This is a generalized form of the MMA algorithm, referred to herein as GMMA.

BRIEF DESCRIPTION OF THE DRAWING

FIG. 19 shows a table of illustrative data values for use in the RCA, CMA, and MMA, blind equalization methods;

FIG. 24 graphically depicts a set of illustrative GMMA parameters for defining symbol subsets for use with 256-CAP.

DETAILED DESCRIPTION

Figure 1:
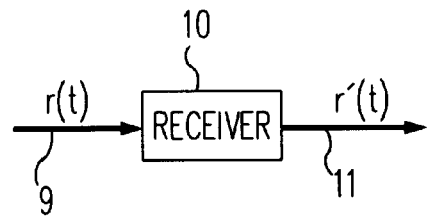
FIG. 1 is an illustrative block diagram of a portion of a communications system embodying the principles of the invention.

An illustrative high-level block diagram of a portion of a communications system embodying the principles of the invention is shown in FIG. 1. For illustrative purposes only, it is assumed that receiver 10 receives a CAP (carrierless, amplitude modulation, phase modulation) signal, which can be represented by:

$$r(t) = \sum_n [a_n p(t-nT) - b_n \tilde{p}(t-nT)] + \xi(t) \tag{1}$$

where $a_n$ and $b_n$ are discrete-valued multilevel symbols, p(t) and $\tilde{p}$(t) are impulse responses which form a Hilbert pair, T is the symbol period, and $\xi(t)$ is additive noise introduced in the channel.

It is assumed that the CAP signal in equation (1) has been distorted while propagating through communications channel 9 and experiences intersymbol interference (ISI). This ISI consists of intrachannel ISI ($a_n$ or $b_n$ symbols interfering with each other) and interchannel ISI ($a_n$ and $b_n$ symbols interfering with each other). The purpose of receiver 10 is to remove the ISI and minimize the effect of the additive noise $\xi(t)$ to provide signal r'(t). The inventive concept will illustratively be described in the context of a GMMA blind equalization algorithm for use within receiver 10. However, before describing the inventive concept, some background information on adaptive filters and the above-mentioned RCA, CMA, and MMA algorithms is presented. Also, as used herein, an adaptive filter is, e.g., a fractionally spaced linear equalizer, which is hereafter simply referred to as an FSLE equalizer or, simply, an equalizer.

Equalizer Structures

Figure 2:
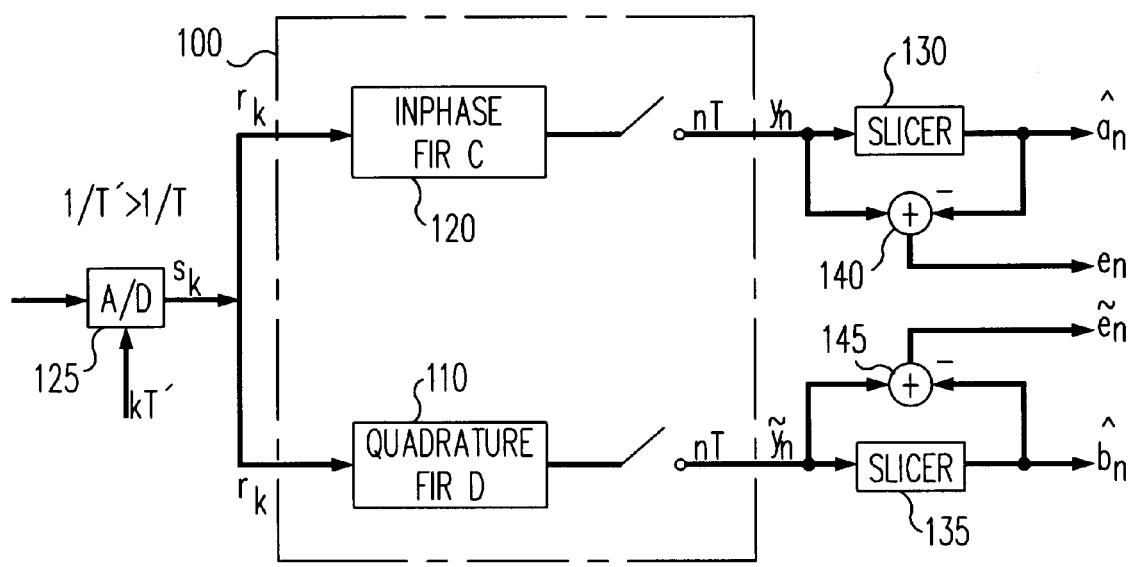
FIG. 2 is an illustrative block diagram of a phase-splitting equalizer.
Figure 3:
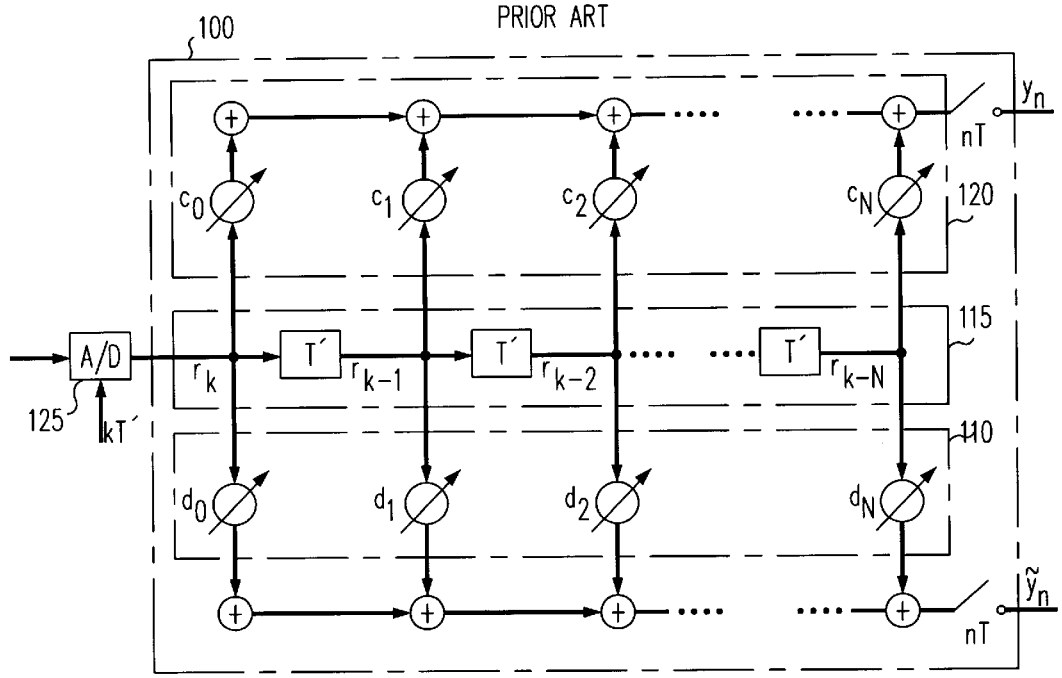
FIG. 3 is an illustrative block diagram of a portion of an adaptive filter for use in an equalizer.

An illustrative phase-splitting FSLE equalizer 100 is shown in FIG. 2. It is assumed that FSLE equalizer 100 operates on an input signal comprising two dimensions: an in-phase component and a quadrature component. FSLE equalizer 100 comprises two parallel digital adaptive filters implemented as finite impulse response (FIR) filters 110 and 120. Equalizer 100 is called a "phase-splitting FSLE" because the two FIR filters 110 and 120 converge to in-phase and quadrature filters. Some illustrative details of the equalizer structure are shown in FIG. 3. The two FIR filters 110 and 120 share the same tapped delay line 115, which stores sequences of successive Analog-to-Digital Converter (A/D) 125 samples $r_k$. The sampling rate 1/T' of A/D 125 is typically three to four times higher than the symbol rate 1/T and is chosen in such a way that it satisfies the sampling theorem for real signals. It is assumed that T/T'=i, where i is an integer.

The outputs of the two adaptive FIR filters 110 and 120 as shown in FIG. 3 are computed at the symbol rate 1/T. The equalizer taps and input samples can be represented by a corresponding N-dimensional vector. As such, the following relationships are now defined:

$r_n^T = [r_k, r_{k-1}, \ldots, r_{k-N}]$=vector of AD samples in delay line; (2)

$c_n^T = [c_0, c_1, c_2, \ldots, c_N]$=vector of in-phase tap coefficients; and (3)

$d_n^T = [d_0, d_1, d_2, \ldots, d_N]$=vector of quadrature phase tap coefficients; (4)

where the superscript T denotes vector transpose, the subscript n refers to the symbol period nT, and k=in.

Let $y_n$ and $\tilde{y}_n$ be the computed outputs of the in-phase and quadrature filters, respectively, and:

$$y_n = c_n^T r_n; \text{ and} \quad (5)$$

$$\tilde{y}_n = d_n^T r_n. \quad (6)$$

Figure 6:
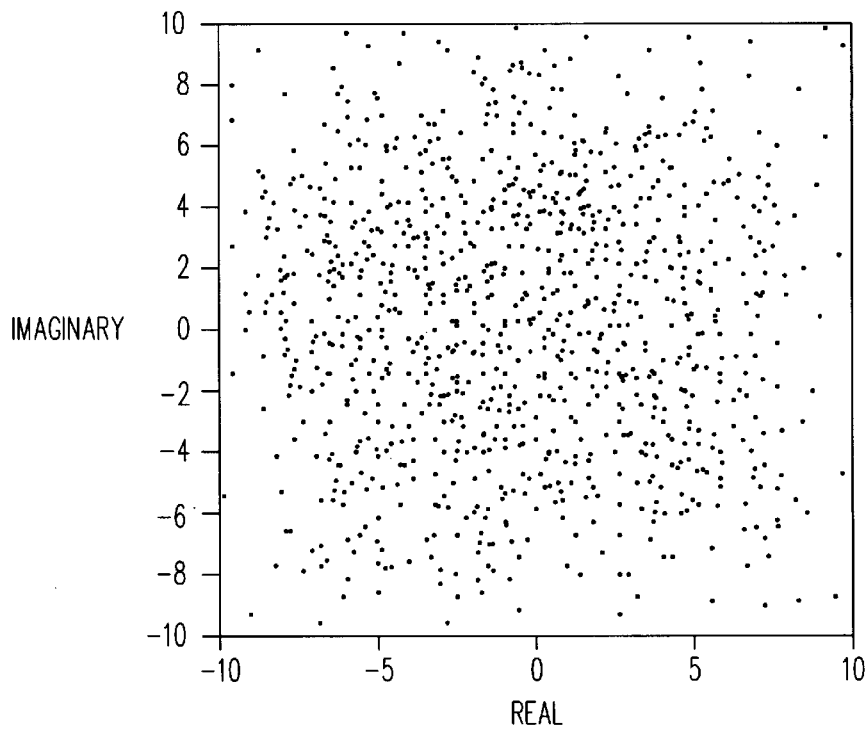
FIG. 6 is an illustrative signal point plot of an output signal of an equalizer before convergence.
Figures 17, 18:
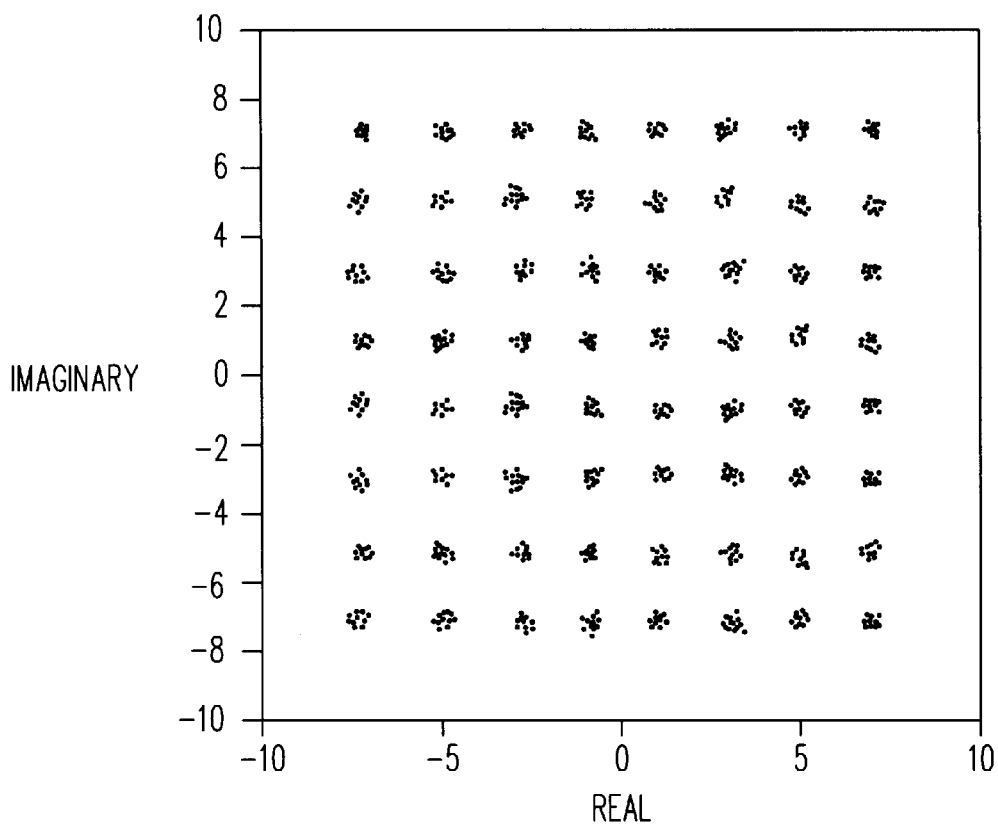
FIG. 18 shows a table providing a general comparison between the RCA, CMA, and MMA, blind equalization methods, without CHCF.

An X/Y display of the outputs $y_n$ and $\tilde{y}_n$ or, equivalently, of the complex output $Y_n = y_n + j\tilde{y}_n$, is called a signal constellation. FIGS. 6 and 17 show an 64-CAP constellation before and after illustrative convergence using the MMA algorithm. (The term "64-CAP," refers to the number of predefined symbols in the signal space or signal constellation each symbol representing 6 bits since $2^6 = 64$. Additional information on a CAP communications system can be found in J. J. Werner, "Tutorial on Carrierless AM/PM—Part I—Fundamentals and Digital CAP Transmitter," *Contribution to ANSI X3T9.5 TP/PMD Working Group*, Minneapolis, Jun. 23, 1992.) After convergence, the signal constellation consists of a display of the complex symbols $A_n = a_n + jb_n$ corrupted by some small noise and ISI.

In the normal mode of operation, decision devices (or slicers) 130 and 135 shown in FIG. 2 compare the sampled outputs $y_n$ and $\tilde{y}_n$ of equalizer 100 with valid symbol values $a_n$ and $b_n$ and makes a decision on which symbols have been transmitted. These sliced symbols will be denoted $\hat{a}_n$ and $\hat{b}_n$. The receiver then computes the following in-phase and quadrature errors $e_n$ and $\tilde{e}_n$:

$$e_n = y_n - \hat{a}_n, \quad (7a)$$

$$\tilde{e}_n = \tilde{y}_n - \hat{b}_n, \quad (7b)$$

and the tap coefficients of the two adaptive filters are updated using the familiar least-mean-square (LMS) algorithm, i.e., $$c_{n+1} = c_n - \alpha e_n r_n, \quad (8a)$$

$$d_{n+1} = d_n - \alpha \tilde{e}_n r_n, \quad (8b)$$

where $\alpha$ is the step size used in the tap adjustment algorithm.

Figure 4:
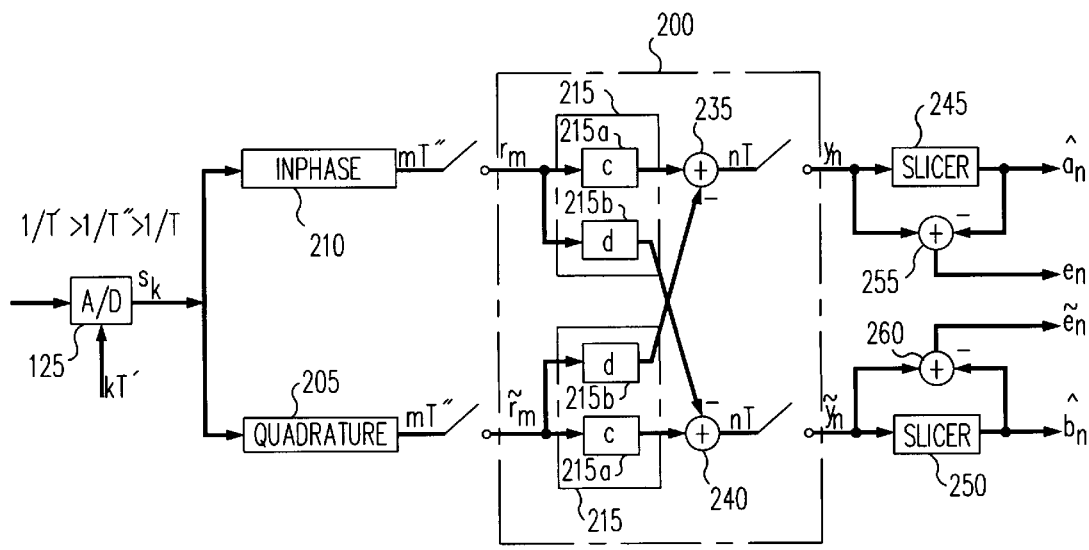
FIG. 4 is an illustrative block diagram of a cross-coupled equalizer.

Turning now to FIG. 4, a cross-coupled FSLE, 200, is shown. For this equalizer structure, the A/D samples are first fed to two fixed in-phase and quadrature FIR filters, 210 and 205, respectively. In this case, the sampling rate 1/T' of A/D 125 is typically equal to four times the symbol rate 1/T. The outputs of the two fixed FIR filters are computed at a rate 1/T" that is consistent with the sampling theorem for analytic signals as known in the art. The output signals are then fed to equalizer 200 having a so-called cross-coupled structure. Typically, 1/T" is twice the symbol rate 1/T.

The cross-coupled equalizer 200 uses two adaptive FIR filters 215a and 215b, each with tap vectors $c_n$ and $d_n$. For simplicity, the same tap vector notations $c_n$ and $d_n$ (which have been used for the previous described equalizer 100 of FIG. 2) are used again. However, it should be clear to those skilled in the art that the tap vectors are different for the two types of equalizers. These two filters are each used twice to compute the outputs $y_n$ and $\tilde{y}_n$ of the equalizer. Let $r_n$ and $\tilde{r}_n$ be the output vectors of the in-phase and quadrature filters that are used to compute the outputs of the cross-coupled equalizer. The following definitions can be made:

$$C_n = c_n + jd_n, \quad (9a)$$

$$R_n = r_n + j\tilde{r}_n, \text{ and} \quad (9b)$$

$$Y_n = y_n + j\tilde{y}_n. \quad (9c)$$

The complex output $Y_n$ of the equalizer can be written in the following compact way:

$$Y_n = C_n^{*T} R_n, \quad (10)$$

where the asterisk * denotes complex conjugate. Making the following definitions for the sliced complex symbol $\hat{A}_n$ and the complex error $E_n$:

$$\hat{A}_n = \hat{a}_n + j\hat{b}_n, \quad (11a)$$

$$E_n = Y_n - \hat{A}_n. \quad (11b)$$

The LMS algorithm for updating the complex tap vector $C_n$ can be written as:

$$C_{n+1} = C_n - \alpha E_n^* R_n. \quad (12)$$

Figure 5:
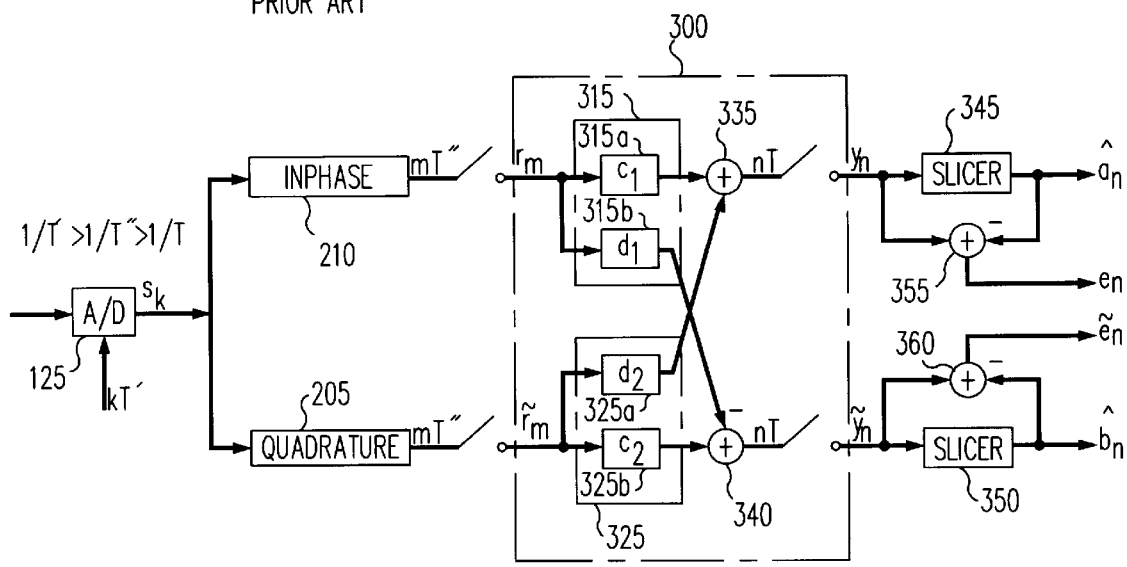
FIG. 5 is an illustrative block diagram of a four-filter equalizer.

Turning now to FIG. 5, a four-filter FSLE is shown. Four-filter equalizer 300 has the same general structure as cross-coupled FSLE 200 shown in FIG. 4, except that the adaptive portion consists of four different filters rather than two filters which are used twice. For this reason it is called a four-filter FSLE. The two output signals of equalizer 300 are computed as follows:

$$y_n = c_{1,n}^T r_n + d_{2,n}^T \tilde{r}_n, \text{ and} \tag{13a}$$

$$\tilde{y}_n = c_{2,n}^T \tilde{r}_n - d_{1,n}^T r_n. \tag{13b}$$

Using the definitions for the in-phase and quadrature errors $e_n$ and $\tilde{e}_n$ in equations (7a) and (7b), the following tap updating algorithms for the four filters result:

$$c_{1,n+1} = c_{1,n} - \alpha e_n r_n, \tag{14a}$$

$$d_{1,n+1} = d_{1,n} + \alpha \tilde{e}_n r_n, \tag{14b}$$

$$c_{2,n+1} = c_{2,n} - \alpha \tilde{e}_n \tilde{r}_n, \text{ and} \tag{15a}$$

$$d_{2,n+1} = d_{2,n} - \alpha e_n \tilde{r}_n. \tag{15b}$$

Having generally described the structure of some prior-art equalizers as shown in FIGS. 2–5, a general overview of the concept of blind equalization will now be described using the equalizer structure of FIG. 2.

Concept of Blind Equalization

In the normal (steady-state) mode of operation, the decision devices in FIG. 2, i.e., slicers 130 and 135, compare the equalizer complex output samples, $Y_n$, (where $Y_n = y_n + j\tilde{y}_n$), with all the possible transmitted complex symbols, $A_n$ (where $A_n = a_n + jb_n$), and selects the symbol $\hat{A}_n$ which is the closest to $Y_n$. The receiver then computes an error, $E_n$, where:

$$E_n = Y_n - \hat{A}_n, \tag{16}$$

which is used to update the tap coefficients of equalizer 100. This type of tap adaptation is called "unconstrained decision directed" (hereafter simply referred to as "decision directed", because it uses the decisions of slicers 130 and 135. (Although it is known that a blind equalization algorithm can also be referred to as a "constrained decision directed" algorithm, the phrase "decision directed" is used herein to refer to unconstrained decision directed algorithms such as the LMS algorithm.) The most common tap updating algorithm is the LMS algorithm, which is a stochastic gradient algorithm that minimizes the mean square error (MSE), which is defined as:

$$MSE \triangleq E[|E_n|^2] = E[|Y_n - \hat{A}_n|^2] = E[e_n^2] + E[\tilde{e}_n^2], \tag{17}$$

where E[.] denotes expectation and $e_n$ and $\tilde{e}_n$ are in-phase and quadrature errors, respectively.

At the beginning of start-up, the output signal of equalizer 100, $Y_n$, is corrupted by a lot of intersymbol interference, as illustrated in FIG. 6. The latter represents experimental data obtained for a 64-CAP receiver using a phase-splitting FSLE as represented by FIG. 2.

When a training sequence is used during start-up (i.e., a predefined sequence of $A_n$ symbols), the receiver can compute meaningful errors $E_n$ by using the equalizer output signal $Y_n$ and the known sequence of transmitted symbols $A_n$. In this case, tap adaptation is said to be done with "ideal reference" to distinguish it from decision directed tap adaptation.

However, when no training sequence is available, equalizer 100 has to be converged blindly. In this case, a decision-directed tap updating algorithm cannot be used to converge the equalizer, because the slicer makes too many wrong decisions, as should be apparent from FIG. 6.

As such, the philosophy of blind equalization is to use a tap adaptation algorithm that minimizes a cost function that is better suited to provide initial convergence of equalizer 100 than the MSE represented by equation (17). The cost functions used in the RCA, CMA, and MMA algorithms are described below.

Convergence of an equalizer during blind start-up usually consists of two main steps. First, a blind equalization algorithm is used to open the "eye diagram." (Hereafter, this will be referred to as "it opens the eye.") Once the eye is open enough, the receiver switches to a decision directed tap adaptation algorithm.

Reduced Constellation Algorithm (RCA)

This section provides a general overview of the RCA algorithm. This general overview is then followed with a description of the RCA algorithm in the context of each of the illustrative equalizer structures, described above.

Figure 8:
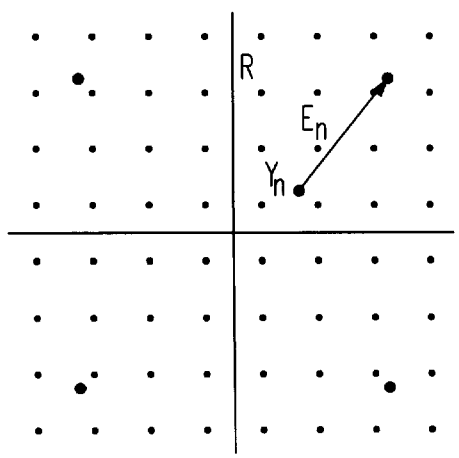
FIG. 8 is an illustrative signal point plot illustrating the reduced signal point constellation of the RCA blind equalization method.

With the RCA algorithm, the error used in the tap updating algorithm is derived with respect to a signal constellation that has a smaller number of points than the received constellation. As illustration, it is again assumed that the signal constellation comprises 64 symbols. In the RCA algorithm, the reduced constellation typically consists of four signal points only, as shown in FIG. 8. It should be noted that the RCA algorithm requires the use of a decision device, e.g., a slicer, to select the closest signal point from the reduced constellation. The error between the received sample $Y_n$ and the closest signal point $\hat{A}_{r,n}$ of the reduced constellation is the complex number:

$$E_{r,n} = e_{r,n} + j\tilde{e}_{r,n} = Y_n - \hat{A}_{r,n}, \text{ where} \tag{18}$$

$$\hat{A}_{r,n} = \hat{a}_{r,n} + j\hat{b}_{r,n} = R[\text{sgn}(y_n) + j\,\text{sgn}(\tilde{y}_n)], \text{ and} \tag{19}$$

where sgn (.) is the signum function and the expression on the right corresponds to the case where the reduced constellation consists of four points. The reduced constellation algorithm minimizes the following cost function:

$$CF = E[|E_{r,n}|^2] = E[e_{r,n}^2 + \tilde{e}_{r,n}^2] = E[|Y_n - \hat{A}_{r,n}|^2], \tag{20}$$

where E [.] denotes expectation and where $e_{r,n}$ refers to the slicer error.

Now, consider the phase-splitting equalizer structure shown in FIG. 2. Using equations (5), (6), and (20), the following equations result:

$$e_{r,n} = y_n - \hat{a}_{r,n} = c^T_n r_n - R\,\text{sgn}(y_n), \tag{21a}$$

$$\tilde{e}_{r,n} = \tilde{y}_n - \hat{b}_{r,n} = d^T_n r_n - R\,\text{sgn}(\tilde{y}_n) \tag{21b}$$

The gradients of the cost function represented by equation (20) with respect to the tap vectors $c_n$ and $d_n$ are equal to:

$$\nabla_c(CF) = 2E[e_{r,n} r_n], \text{ and} \tag{22a}$$

$$\nabla_d(CF) = 2E[\tilde{e}_{r,n} r_n]. \tag{22b}$$

These gradients are equal to zero when the channel is perfectly equalized, i.e. when the received samples $Y_n$ are equal to the symbol values $A_n$. This condition leads to the following value of R:

$$R = \frac{E[a_n^2]}{E[|a_n|]}. \tag{23}$$

For example, consider the gradient with respect to the tap vector $c_n$. From the left of equations (21a) and (21b) there is the condition: $E[(y_n-R\,\text{sgn}(y_n))r_n]=0$. With perfect equalization $y_n=a_n$. Also, if it is assumed that different symbols are uncorrelated, then: $E[a_n r_n]=k_n E[a_n^2]$, where $k_n$ is a fixed vector whose entries are a fulnction of the channel. The above condition can then be written as: $E[a^2]-R\,E[\text{sgn}(a_n)\,a_n]=0$. Noting that $\text{sgn}(a_n)a_n=|a_n|$ and solving for R, equation (23) results.

The nonaveraged gradients in equations (22a) and (22b) can be used in a stochastic gradient algorithm to adapt the tap coefficients of the equalizer, so that the following tap updating algorithms result:

$$c_{n+1}=c_n-\alpha[y_n-R\,\text{sgn}(y_n)]r_n,\text{ and} \tag{24a}$$

$$d_{n+1}=d_n-\alpha[\tilde{y}_n-R\,\text{sgn}(\tilde{y}_n)]r_n. \tag{24b}$$

Turning now to the cross-coupled FSLE structure illustrated by FIG. 4, the complex output $Y_n$ of this equalizer is computed from equation (10). Using this expression in equation (20), the gradient of the cost function with respect to the complex tap vector $C_n$ is:

$$\nabla_c=E[(Y_n-\hat{A}_{r,n})^*R_n]. \tag{25}$$

Assuming a perfectly equalized channel the following expression for R results:

$$R = \frac{E[|A_n|^2]}{E[|a_n|]+E[|b_n|]} = \frac{E[|A_n|^2]}{2E[|a_n|]}, \tag{26}$$

where the expression on the right is the same as the one in equation (23) for the usual case where $E[|a_n|]=E[|b_n|]$. The tap updating algorithm for the complex tap vector $C_n$ is given by $$C_{n+1}=C_n-\alpha(Y_n-\hat{A}_{r,n})^*R_n. \tag{27}$$

Turning now to the four-filter FSLE structure illustrated by FIG. 5, the outputs $y_n$ and $\tilde{y}_n$ of this four-filter equalizer structure are computed from equations (13a) and (13b). The gradients of the cost function in equation (20) with respect to the four tap vectors are similar to the ones given in equations (22a) and (22b) and will not be repeated here. The tap updating algorithms are given by:

$$c_{1,n+1}=c_{1,n}-\alpha[y_n-R\,\text{sgn}(y_n)]r_n, \tag{28a}$$

$$d_{1,n+1}=d_{1,n}+\alpha[\tilde{y}_n-R\,\text{sgn}(\tilde{y}_n)]r_n \tag{28b}$$

$$c_{2,n+1}=c_{2,n}-\alpha[\tilde{y}_n-R\,\text{sgn}(\tilde{y}_n)]\tilde{r}_n,\text{ and} \tag{28c}$$

$$d_{2,n+1}=d_{2,n}-\alpha[y_n-R\,\text{sgn}(y_n)]\tilde{r}_n, \tag{28d}$$

where the constant R is the same as in equation (23).

The main advantage of RCA is its low cost of implementation because it is typically the least complex of blind equalization algorithms. The tap updating algorithms represented by equations (24a), (24b), (27) and (28) are the same as the standard LMS algorithms represented by equations (8a) and (8b) except that the slicer uses a different number of points.

The main disadvantages of RCA are its unpredictability and lack of robustness. The algorithm is known to often converge to so-called "wrong solutions." These solutions are quite acceptable from a channel equalization perspective, but do not allow the receiver to recover the right data. It should be pointed out that the equalizer structure in FIG. 2 is much more likely to converge to wrong solutions than the structure in FIG. 4. This is due to the fact that the former has many more degrees of freedom than the latter.

Figure 16:
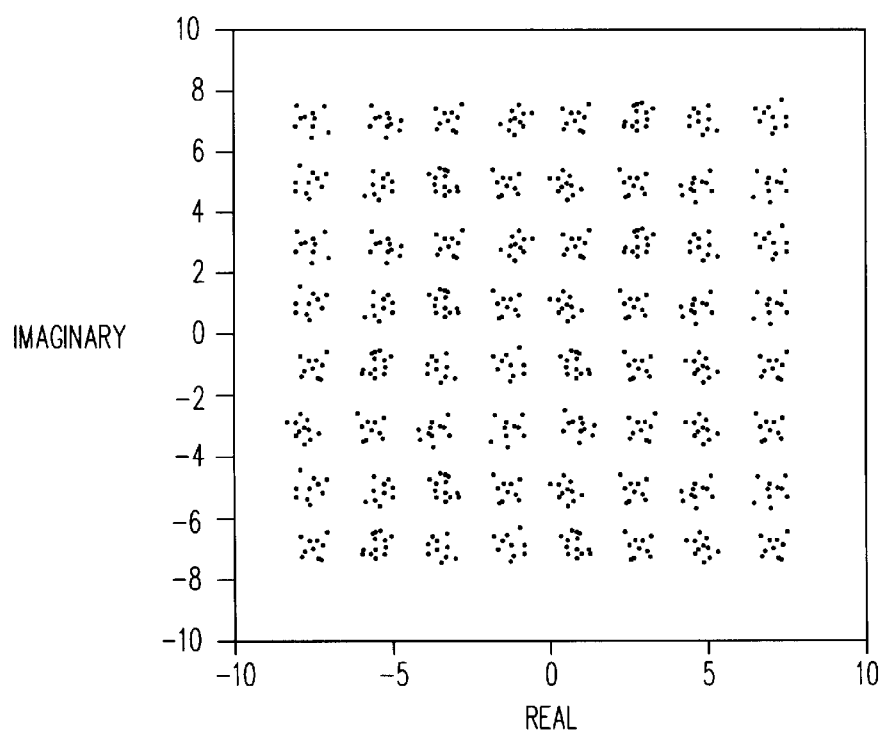
FIGS. 16 and 17 are illustrative signal point plots of an output signal of an equalizer for a communications system using a two-step MMA blind equalization method.
Figures 20, 21:
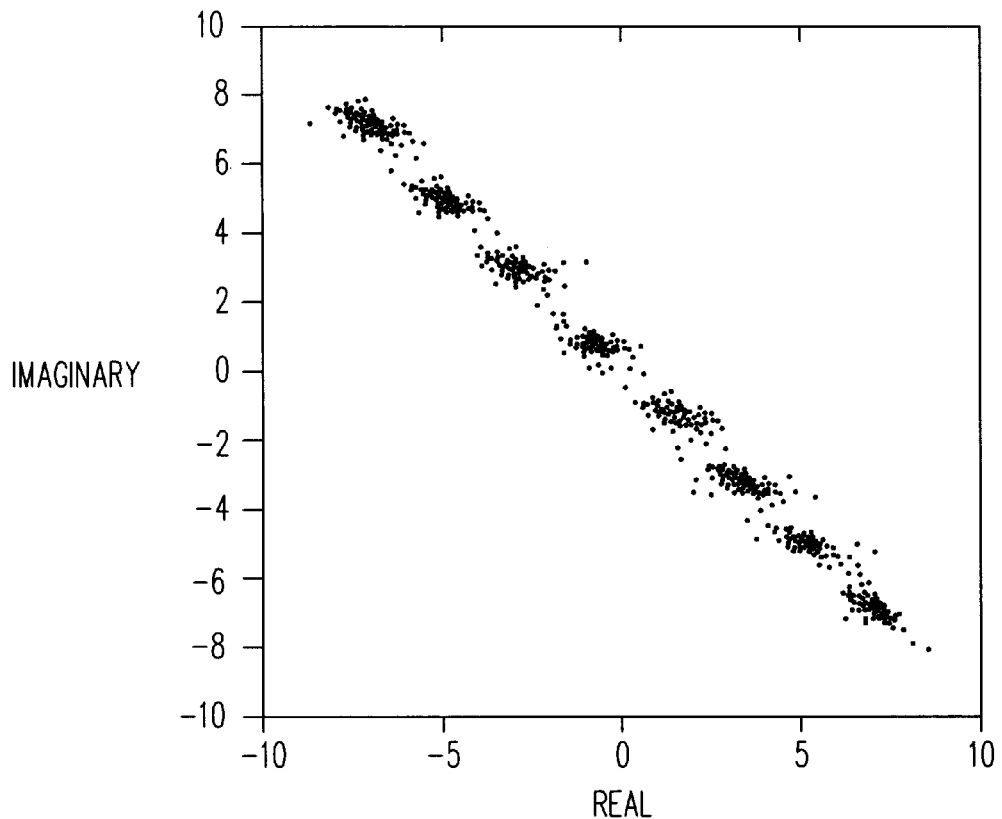
FIG. 20 is an illustrative graph of an incorrect diagonal solution for a 64-CAP signal point constellation.
FIG. 21 shows an illustrative table for comparing cost functions with increasing number of symbol levels.

A wrong solution that is often observed with the equalizer structure in FIG. 2 is the so-called diagonal solution. In this case, the in-phase and quadrature filters both converge to the same filter, so that they both generate the same output samples. As a result, the signal constellation at the output of the equalizer consists of points clustered along a diagonal as illustrated in FIG. 20 for a 64-CAP signal point constellation. It has been found that frequency of occurrence of diagonal solutions is mostly communications channel dependent. Specifically, it is created when certain fractional propagation delay offsets are introduced in the channel. (As a point of contrast, FIG. 16 shows an illustrative correct solution for a 64-CAP signal point constellation using the MMA blind equalization algorithm.)

Other wrong solutions can occur when the in-phase and quadrature filters introduce propagation delays which differ by an integral number of symbol periods. As an example, at a given sampling instant, a, may appear at the output of the in-phase filter while $b_{n-1}$ appears at the output of the quadrature filter. This kind of wrong solution can generate points in the signal constellation at the output of the equalizer that do not correspond to transmitted symbols. For example, a 32-point signal constellation may be converted into a 36-point constellation and the 128-point constellation in FIGS. 13, 14 and 15 may be converted into a 144-point constellation.

Constant Modulus Algorithm (CMA)

This section provides a general overview of the CMA algorithm. This general overview is then followed with a description of the CMA algorithm in the context of each of the illustrative equalizer structures, described above.

Figure 9:
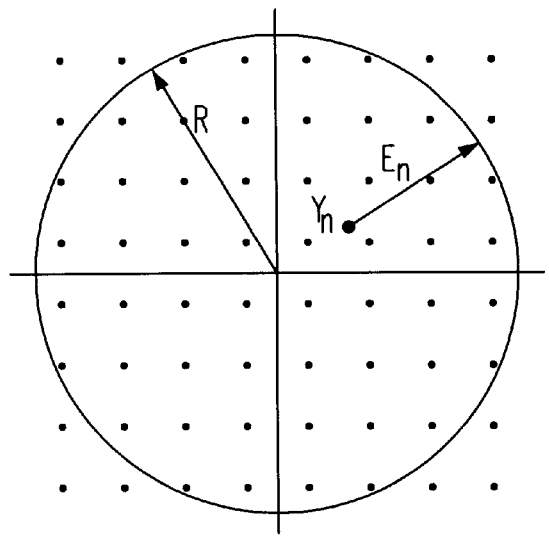
FIG. 9 is an illustrative signal point plot illustrating the circular contour of the CMA blind equalization method.

The CMA algorithm minimizes the dispersion of the equalized samples $Y_n$ with respect to a circle with radius R. This is graphically illustrated in FIG. 9. The CMA algorithm minimizes the following cost function:

$$CF=E[(|Y_n|^L-R^L)^2], \tag{29}$$

where L is a positive integer. The case L=2 is the most commonly used in practice. The cost function in equation (29) is a true two-dimensional cost function which minimizes the dispersion of the equalizer complex output signal $Y_n$ with respect to a circular two-dimensional contour.

Now, consider the phase-splitting equalizer structure shown in FIG. 2. The gradients of the cost function with respect to the tap vectors $c_n$ and $d_n$ are given by:

$$\nabla_c(CF)=2L\times E[(|Y_n|^L-R^L)|Y_n|^{L-2}y_n r_n],\text{ and} \tag{30a}$$

$$\nabla_d(CF)=2L\times E[(|Y_n|^L-R^L)|Y_n|^{L-2}\tilde{y}_n r_n]. \tag{30b}$$

Assuming a perfectly equalized channel the following value for $R^L$ results:

$$R^L = \frac{E[|A_n|^{2L-2}a_n^2]}{E[|A_n|^{L-2}a_n^2]} = \frac{E[|A_n|^{2L}]}{E[|A_n|^L]}, \quad (31)$$

where the expression on the right holds for the usual case where the statistics of the symbols $a_n$ and $b_n$ are the same. For L=2, the following stochastic gradient tap updating algorithms results:

$$c_{n+1} = c_n - \alpha(y^2_n + \tilde{y}^2_n - R^2)y_n r_n, \text{ and} \quad (32a)$$

$$d_{n+1} = d_n - \alpha(y^2_n + \tilde{y}^2_n - R^2)\tilde{y}_n r_n. \quad (32b)$$

Turning now to the cross-coupled FSLE structure illustrated by FIG. 4, the gradient of the cost function represented by equation (29) with respect to the complex tap vector $C_n$ is equal to:

$$\nabla_c(CF) = 2L \times E[(|Y_n|^L - R^L)|Y_n|^{L-2} Y^*_n R_n]. \quad (33)$$

For L=2, the tap updating algorithm for the complex tap vector becomes:

$$C_{n+1} = C_n - \alpha(|Y_n|^2 - R^2)Y^*_n R_n, \quad (34)$$

where R is given by the expression on the right in equation (31).

Turning now to the four-filter FSLE structure illustrated by FIG. 5, the gradients of the cost function represented by equation (29) with respect to the four tap vectors are similar to the ones given by equations (30a) and (30b). For L=2, the tap updating algorithms become:

$$c_{1,n+1} = c_{1,n} - \alpha(y^2_n + \tilde{y}^2_n - R^2)y_n r_n, \quad (35a)$$

$$d_{1,n+1} = d_{1,n} + \alpha(y^2_n + \tilde{y}^2_n - R^2)\tilde{y}_n r_n, \quad (35b)$$

$$c_{2,n+1} = c_{2,n} - \alpha(y^2_n + \tilde{y}^2_n - R^2)\tilde{y}_n \tilde{r}_n, \text{ and} \quad (35c)$$

$$d_{2,n+1} = d_{2,n} - \alpha(y^2_n + \tilde{y}^2_n - R^2)y_n \tilde{r}_n. \quad (35d)$$

The constant R is the same as in equation (31).

The main advantages of CMA are its robustness and predictability. Unlike RCA, it rarely converges to wrong solutions. For some applications, other than those considered here, it also has the advantage of being able to partially equalize the channel in the presence of carrier phase variations. The main disadvantage of CMA is its cost of implementation. The CMA tap updating algorithm is more complex than that of the RCA algorithm and the MMA algorithm and, in addition, the CMA algorithm requires a so-called "rotator" at the output of the equalizer. As a result, once a certain degree of convergence is achieved, the output signal of the equalizer must be counter-rotated before switching to a decision-directed tap adaptation algorithm. The need to use a rotator after the equalizer increases the cost of implementation of CMA for some types of applications. It should be pointed out, however, that there are other applications, such as voiceband and cable modems, where the rotator function is required anyway for other purposes, such as tracking frequency offset introduced in the channel. In these latter cases, the need to do a rotation does not increase the cost of implementation, and CMA becomes a very attractive approach.

Multimodulus Algorithm (MMA)

Figure 10:
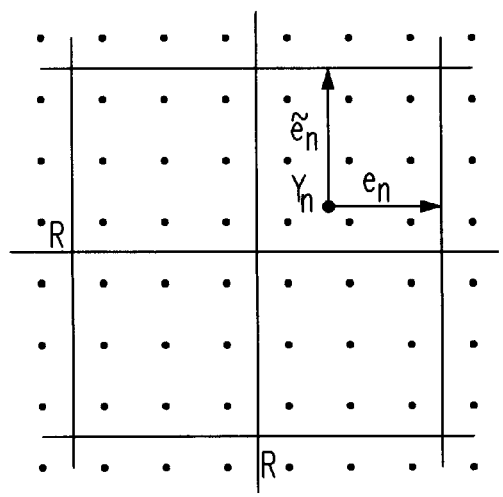
FIG. 10 is an illustrative signal point plot illustrating the piecewise linear contours of the MMA blind equalization method.

The MMA algorithm minimizes the dispersion of the equalizer output samples $y_n$ and $\tilde{y}_n$ around piecewise linear in-phase and quadrature contours. For the special case of square signal constellations of the type used for 16-, 64-, and 256-CAP systems, the contours become straight lines. This is graphically illustrated in FIG. 10 for a 64-point constellation. The multimodulus algorithm minimizes the following cost function:

$$CF = E[(y^L_n - R^L(Y_n))^2 + (\tilde{y}^L_n - \tilde{R}^L(Y_n))^2], \quad (36)$$

where L is a positive integer and $R(Y_n)$ and $\tilde{R}(Y_n)$ take discrete positive values, which depend on the equalizer outputs $Y_n$.

Multimodulus Algorithm (MMA)—Square Constellations

For square constellations, $R(Y_n) = \tilde{R}(Y_n) = R = $ constant, so that the cost function of equation (36) becomes:

$$CF = CF_1 + CF_Q = E[(y^L_n - R^L)^2 + (\tilde{y}^L_n - R^L)^2]. \quad (37)$$

Unlike the cost function for CMA represented by equation (29), this is not a true two-dimensional cost function. Rather, it is the sum of two independent one-dimensional cost functions $CF_1$ and $CF_Q$. The application of the MMA algorithm in the context of the three illustrative types of equalizers (described above) will now be described.

For the phase-splitting equalizer structure shown FIG. 2, the gradients of the cost function in equation (37) with respect to the tap vectors $c_n$ and $d_n$ are equal to:

$$\nabla_c(CF) = 2L \times E[(|y_n|^L - R^L)|y_n|^{L-2} y_n r_n], \text{ and} \quad (38a)$$

$$\nabla_d(CF) = 2L \times E[(|\tilde{y}_n|^L - R^L)|\tilde{y}_n|^{L-2} \tilde{y}_n r_n]. \quad (38b)$$

Assuming a perfectly equalized channel, the following value for $R^L$ results:

$$R^L = \frac{E[a_n^{2L}]}{E[|a_n|^L]} \quad (39)$$

The best compromise between cost and performance is achieved with L=2, in which case the tap updating algorithms become $$c_{n+1} = c_n - \alpha(y^2_n - R^2)y_n r_n, \text{ and} \quad (40a)$$

$$d_{n+1} = d_n - \alpha(\tilde{y}^2_n - R^2)\tilde{y}_n r_n. \quad (40b)$$

Turning now to the cross-coupled FSLE structure illustrated by FIG. 4, the gradient of the cost function represented by equation (37) with respect to the complex tap vector $C_n$ is given by:

$$\nabla_C(CF) = 2L \times E[K^* R_n], \quad (41)$$

where, $$K = [(|y_n|^L - R^L)|y_n|^{L-2} y_n] + j[(|\tilde{y}_n|^L - R^L)|\tilde{y}_n|^{L-2} \tilde{y}_n]. \quad (42)$$

Assuming a perfectly equalized channel, the value for $R^L$ is:

$$R^L = \frac{E[a_n^{2L} + b_n^{2L}]}{E[|a_n|^L + |b_n|^L]}, \quad (43)$$

which reduces to equation (39) for the usual case where the symbols $a_n$ and $b_n$ have the same statistics. For L=2, the tap updating algorithm for the complex tap vector $C_n$ becomes:

$$C_{n+1}=C_n-\alpha K^* R_n, \quad (44)$$

where, $$K=(y^2-R^2)y+j(\tilde{y}^2-R^2)\tilde{y}. \quad (45)$$

Turning now to the four-filter FSLE structure illustrated by FIG. 5, the gradients of the cost function represented by equation (37) with respect to the four tap vectors are similar to the ones given in equations (38a) and (38b). For L=2, the tap updating algorithms become:

$$c_{1,n+1}=c_{1,n}-\alpha(y^2_n-R^2)y_n r_n, \quad (46a)$$

$$d_{1,n+1}=d_{1,n}+\alpha(\tilde{y}^2_n-R^2)\tilde{y}_n r_n, \quad (46b)$$

$$c_{2,n+1}=c_{2,n}-\alpha(\tilde{y}^2_n-R^2)\tilde{y}_n \tilde{r}_n, \text{ and} \quad (46c)$$

$$d_{2,n+1}=d_{2,n}-\alpha(y^2_n-R^2)y_n \tilde{r}_n. \quad (46d)$$

The constant R is the same as in equation (39).

Figure 7:
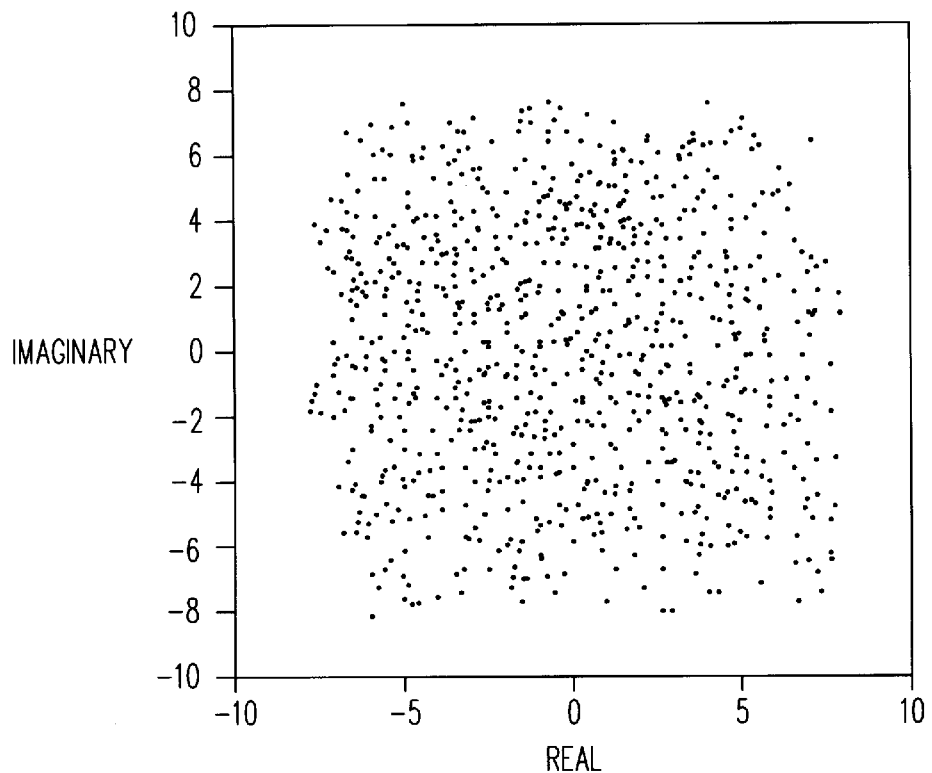
FIG. 7 is an illustrative signal point plot of an output signal of an equalizer for a system using the MMA blind equalization method.

The above-mentioned two-step blind equalization procedure utilizing the MMA algorithm is graphically illustrated by FIGS. 6, 7, 16, and 17 for equalizer 100. The output signal of equalizer 100, before any form of convergence, is shown in FIG. 6. As noted above, FIG. 6 represents experimental data obtained for a 64-CAP receiver using a phase-splitting FSLE as represented by FIG. 2. FIG. 7 illustrates the beginning of the MMA process convergence. As shown in FIG. 16, the MMA technique converges the equalizer enough to clearly illustrate the 64-symbol signal space as 64 noisy clusters. Although these noisy clusters would, typically, not be acceptable for steady-state operation—the eye is open enough to allow the receiver to switch to a 64-point slicer and a decision-directed LMS algorithm. The end result is a much cleaner constellation, as shown in FIG. 17. Typically, a clean transition can be made between the two modes of adaptation, MMA and decision directed, when the symbol error rate is better than $10^{-2}$, although successful transitions have been observed for worse symbol error rates. It should be pointed out that the noisy clusters in FIG. 16 could be further reduced by decreasing the step size in the MMA tap adjustment algorithm. Indeed, in some applications it may be possible to eliminate the switching to a decision directed tap adaptation algorithm. However, it should be noted that this would increase the start-up time and the required amount of digital precision.

The MMA algorithm for square constellations can be used without modification for nonsquare constellations. In this case, caution has to be exercised in the computation of the constant R, because the discrete levels for the symbols $a_n$ and $b_n$ do not all have the same probability of occurrence (described below). However, it has been found through computer simulations that convergence of the MMA algorithm is somewhat less reliable for nonsquare constellations than for square constellations. This can be corrected by using the modified MMA discussed in the following section.

Multimodulus Algorithm (MMA)—NonSquare Constellations

Figure 13:
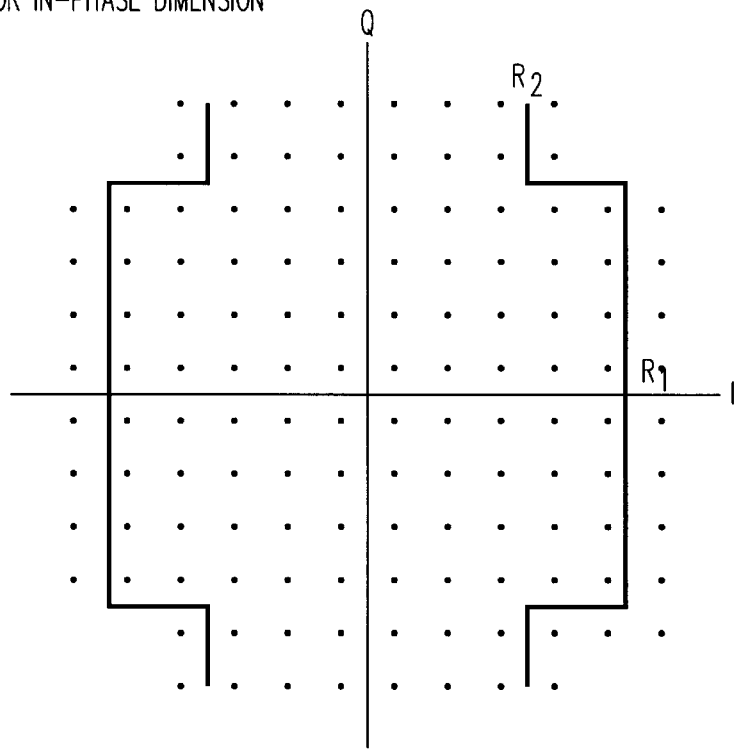
FIGS. 13, 14, and 15 are illustrative signal point plots illustrating the piecewise linear contours of the MMA blind equalization method for a nonsquare constellation.
Figure 14:
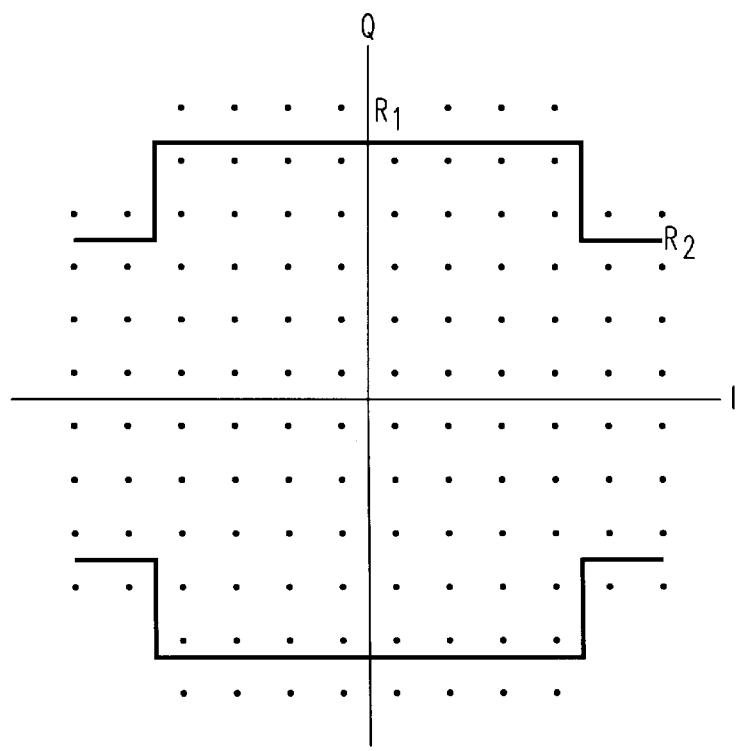
Figure 15:
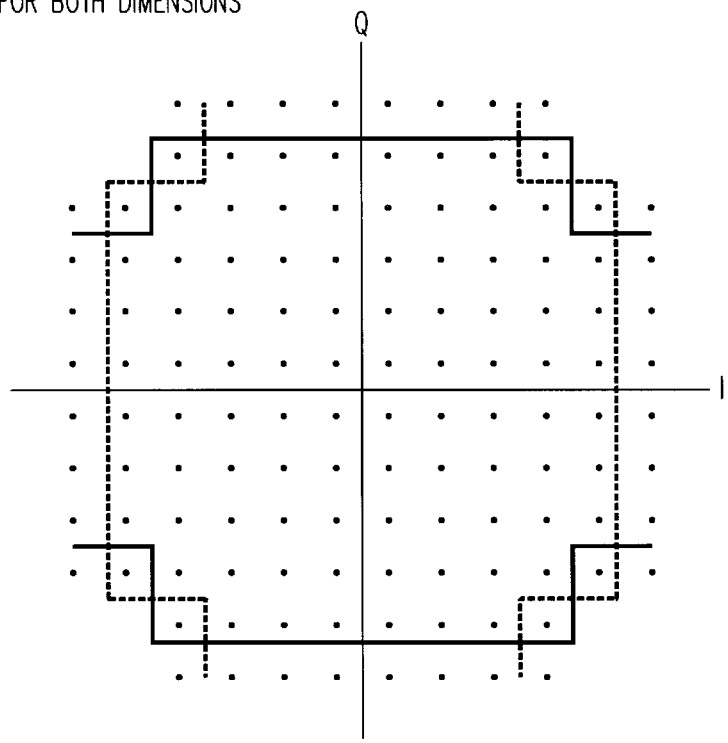

The principle of the modified MMA is illustrated in FIGS. 13, 14, and 15, with respect to a 128-CAP signal constellation. (A 128-point signal constellation is obtained in the following way. First define a 144-point signal constellation using the symbol levels ±1,±3,±5,±7,±9,±11, and then remove the four corner points in each quadrant.) Minimization of the dispersion of the equalizer output samples $y_n$ and $\tilde{y}_n$ is now done around piecewise straight lines. Again, this is done independently for $y_n$ and $\tilde{y}_n$. The quatradure cost functions derived from equation (37) are:

$$CF_Q=E[(\tilde{y}^L_n-R^L_1)^2] \text{ if } |\tilde{y}_n|<K, \text{ and} \quad (47a)$$

$$CF_Q=E[(\tilde{y}_n^L-R_2^L)^2] \text{ if } |\tilde{y}_n|>K. \quad (47b)$$

The in-phase cost functions derived from equation (37) are:

$$CF_I=E[(y^L_n-R_1^L)^2] \text{ if } |y_n|<K, \text{ and} \quad (47c)$$

$$CF_I=E[(y^L_n-R_2^L)^2] \text{ if } |y_n|>K. \quad (47d)$$

The constant K is a function of the signal constellation under consideration and is determined empirically. In computer simulations for 128-CAP, a suggested value is K=8. Two different moduli $R_1$ and $R_2$ are used in equations (47) because the symbols $a_n$ and $b_n$ used in the 128-point constellation have two sets of levels $\{\pm 1, \pm 3, \pm 5, \pm 7\}$ and $\{\pm 9, \pm 11\}$ which have a different probability of occurrence. More moduli can be used if there are more than two sets of symbol levels with different statistics.

The moduli $R_1$ and $R_2$ in equations (47) are computed from equation (39) by evaluating the moments of the symbols over the set of symbol levels to which a given modulus applies (additionally described below). As an example, consider FIG. 13, which illustrates the moduli for the in-phase dimension and which applies to the real symbols $a_n$ of a 128-CAP signal constellation. The moments of the symbols can be computed by considering the first quadrant only. Consider the subset of 24 symbols in this quadrant that applies to $R_1$. For these symbols $a_n$=1, 3, 5, 7, 9, 11; and $b_n$=1, 3, 5, 7; so that each value of $a_n$ occurs with probability $\frac{4}{24}=\frac{1}{6}$. Similarly, the $R_2$ subset has 8 symbols for which $a_n$=1, 3, 5, 7 and $b_n$=9, 11, so that each value of $a_n$ occurs with probability $\frac{2}{8}=\frac{1}{4}$. Thus, the variance of the symbols becomes:

for $R_1$ symbols, $E[a^2_n]=\frac{1}{6}(1^2+3^2+5^2+7^2+9^2+11^2)\approx 47.67$, and (48a)

for $R_2$ symbols, $E[a^2_n]=\frac{1}{4}(1^2+3^2+5^2+7^2)=21$. (48b)

Other moments of the symbols are computed in a similar fashion and then used in equation (39) to evaluate the values of the various moduli.

The tap updating algorithms for the modified MMA algorithm are the same as the ones given in equations (40), (44), and (46), except that the constant R is replaced by either $R_1$ or $R_2$ depending on which equalizer output sample $Y_n$ is received. FIG. 14 illustrates the moduli for the quadrature dimension and which applies to the symbols $b_n$ of the 128-CAP signal constellation. It should be apparent from FIG. 15, which represents the union of FIGS. 13 and 14, that the in-phase and quadrature tap updating algorithms need not use the same moduli $R_1$ or $R_2$ in a given symbol period.

Moments of Data Symbols

The following description discusses the concept of "moments of data symbols." In particular, the closed-form expressions for the moments $E[|a_n|^L]$, $E[|b_n|^L]$, and $E[|A_n|^L]$ when the symbols $a_n$ and $b_n$ take values proportional to the odd integers ±1,±3,±5,±7, ..., are presented. These expressions are then used to get closed-form expressions for the constants R used in the three blind equalization algorithms and illustrated in the table of FIG. 19 (described below).

First, it is assumed that the symbols $a_n$ and $b_n$ have the same statistics, so that $E[|a_n|^L]=E[|b_n|^L]$. Consider first the following known summations of powers of integers:

$$\sum_{k=1}^{m} k = \frac{1}{2}m(m+1), \tag{49a}$$

$$\sum_{k=1}^{m} k^2 = \frac{1}{6}m(m+1)(2m+1), \tag{49b}$$

$$\sum_{k=1}^{m} k^3 = \frac{1}{4}[m(m+1)]^2, \text{ and} \tag{49c}$$

$$\sum_{k=1}^{m} k^4 = \frac{1}{30}m(m+1)(2m+1)(3m^2+3m-1). \tag{49d}$$

These summations can be used to find closed-form expressions for sums of powers of odd integers. For example, for power one:

$$(1+3+5+7) = (1+2+3+4+5+6+7) - 2(1+2+3) \rightarrow \tag{50}$$

$$\sum_{k=1}^{m}(2k-1) = \sum_{k=1}^{2m-1} k - 2\sum_{k=1}^{m-1} k = m^2,$$

where the two summations in the middle have been evaluated by using the closed-form expression of equation (49a). Similar series manipulations can be used for other sums of powers of odd integers.

Now, consider square signal constellations which use symbols $a_n$ and $b_n$ with values $\pm 1, \pm 3, \pm 5, \pm 7, \ldots \pm(2m-1)$, where m is the number of different symbol levels (in magnitude). As an example, for the 4-CAP, 16-CAP, 64-CAP, and 256-CAP square signal constellations, m=1, 2, 4, and 8, respectively. It is also assumed that all the symbol values are equiprobable. As a result, the moments of the symbols $a_n$ are:

$$E[|a_n|] = \frac{1}{m} \cdot \sum_{k=1}^{m}(2k-1) = m, \tag{51}$$

$$E[a_n^2] = \frac{1}{m} \cdot \sum_{k=1}^{m}(2k-1)^2 = \frac{1}{3}(4m^2 - 1), \tag{52}$$

$$E[|a_n|^3] = \frac{1}{m} \cdot \sum_{k=1}^{m}(2k-1)^3 = m(2m^2 - 1), \text{ and} \tag{53}$$

$$E[a_n^4] = \frac{1}{m} \cdot \sum_{k=1}^{m}(2k-1)^4 = \frac{1}{15}(4m^2 - 1)(12m^2 - 7). \tag{54}$$

Next, consider the complex symbols $A_n = a_n + jb_n$. Assuming that the symbols $a_n$ and $b_n$ are uncorrelated, the following expressions for the even moments of the complex symbols result:

$$E[|A_n|^2] = 2E[a_n^2], \text{ and} \tag{55a}$$

$$E[|A_n|^4] = 2E[a_n^4] + 2[E|a_n^2|]^2. \tag{55b}$$

Using equations (52) and (54) in equation (55b), results in:

$$E[|A_n|^4] = \frac{4}{45}(4m^2 - 1)(28m^2 - 13) \tag{56}$$

The above results can now be used to get closed-form expressions for the constants R used in the various blind equalization algorithms. The following (remarkably simple) expressions for these constants result:

$$R_{rca} \frac{E[a_n^2]}{E[|a_n|]} = \frac{4m^2 - 1}{3m}, \tag{57}$$

$$R_{mma}^2 \frac{E[a_n^4]}{E[a_n^2]} = \frac{12m^2 - 7}{5}, \text{ and} \tag{58}$$

$$R_{mma}^2 \frac{E[|A_n|^4]}{E[|A_n|^2]} = \frac{56m^2 - 26}{15}. \tag{59}$$

With respect to nonsquare signal constellations, the various symbol levels 2k-1 for $a_n$ and $b_n$ have a different probability of occurrence, even when all the complex symbols $A_n$ are equiprobable. This should be apparent from the 128-point constellation illustrated by FIG. 15. In this case, the moments of the symbols have to be computed according to the general formula:

$$E[|a_n|^L] = P_1 \sum_{k=1}^{m_1}(2k-1)^L + P_2 \sum_{m_1+1}^{m_2}(2k-1)^L + P_3 \sum_{m_2+1}^{m_3}(2k-1)^L + \cdots \tag{60}$$

where $P_i$ is the probability of occurrence of the symbol levels appearing in the corresponding summation. For typical 32-CAP and 128-CAP constellations the expression in (60) is restricted to two different probabilities $P_1$ and $P_2$.

Everything else being equal (i.e. symbol rate, shaping filters, etc.), it is possible to guarantee a constant average power at the output of a CAP transmitter if $E[a_n^2] = E[b_n^2] =$ constant, independently of the type of signal constellation that is used. Of course, different signal constellations will have to use different symbol values if the average power constraint has to be satisfied. Thus, in general, a signal constellation will use symbol values $\lambda(2k-1)$ where $\lambda$ is chosen in such a way that the average power constraint is satisfied. For simplicity, it is assumed that $E[a_n^2] = 1$. For square constellations, the value of $\lambda$ can then be determined from equation (52), to result in:

$$E[a_n^2] = \frac{1}{m}\sum_{k=1}^{m}([\lambda(2k-1)])^2 = \frac{\lambda^2(4m^2-1)}{3} = 1 \rightarrow \lambda^2 = \frac{3}{4m^2 - 1} \tag{61}$$

Using this expression of $\lambda$ in equations (57), (58), and (59), the following expressions for the normalized constants R result:

$$\bar{R}_{rca} = \lambda \frac{E[a_n^2]}{E[|a_n|]} = \frac{\sqrt{4m^2 - 1}}{m\sqrt{3}}, \tag{62}$$

$$\bar{R}_{mma}^2 = \lambda^2 \frac{E[a_n^4]}{E[a_n^2]} = \frac{3}{5}\frac{12m^2 - 7}{4m^2 - 1}, \text{ and} \tag{63}$$

$$\overline{R}_{cma}^2 = \lambda^2 \frac{E[|A_n|^4]}{E[|A_n|^2]} = \frac{1}{5} \frac{56m^2 - 26}{4m^2 - 1}. \quad (64)$$

Similar expressions can be obtained for nonsquare constellations in a similar fashion. When the number of points in the signal constellation becomes very large, the following asymptotic values for the normalized constants result:

$$m \to \infty \quad \overline{R}_{rca} \approx 1.155 \quad \overline{R}_{mma} \approx 1.342 \quad \overline{R}_{cma} \approx 1.673. \quad (65)$$

Summary of RCA, CMA, and MMA Algorithms

A general comparison of the RCA, CMA, and MMA techniques is shown in the table of FIG. 18. In addition, the table shown in FIG. 19 shows illustrative values, for signal constellations of different sizes, of the constants R, $R_1$, and $R_2$, which are used in the tap updating algorithms of the RCA, CMA, and MMA, blind equalization techniques described above. The data shown in FIG. 19 assumes that the symbols $a_n$ and $b_n$ take the discrete values $\pm 1, \pm 3, \pm 5, \pm 7, \ldots$. The closed-form expressions for these constants are derived as described above.

Generally speaking, the RCA algorithm has less reliable convergence than either the CMA or MMA algorithms. As between the CMA and MMA algorithms, these algorithms have both benefits and drawbacks. For example, the CMA algorithm provides reliable convergence—thus avoiding incorrect diagonal solutions—but the CMA algorithm requires an expensive rotator. In comparison, the MMA algorithm does not require an expensive rotator but is more susceptible than the CMA algorithm to incorrect convergence.

Number of Symbol Levels

Any blind convergence technique is affected by the distribution of the output signals, or samples, of the equalizer. As such, an increase in the number of symbol levels, m, increases the distribution of the equalizer output samples, which—in turn—makes it more difficult to blindly converge the equalizer. This is illustrated by the following comparison between the MMA blind equalization algorithm and the standard LMS algorithm.

For the standard LMS algorithm, the cost function minimizes the error $e_n$ between the equalizer's output signals $Y_n$ and an unknown sequence of transmitted symbols $A_n$:

$$CF = E[(Y_n - A_n)^2] = E[(y_n - a_n)^2 + (\tilde{y}_n - b_n)^2] = E[e_n^2(LMS) + \tilde{e}_{r,n}^2(LMS)] \quad (66)$$

where $Y_n = y_n + j\tilde{y}_n$, and $A_n = a_n + jb_n$.

In comparison, for the MMA blind equalization algorithm, the cost function minimizes the dispersion of the constellation:

$$CF = E[(y_n^2 - R^2)^2 + (\tilde{y}_n^2 - R^2)^2] = E[e_{r,n}^2(CF) + \tilde{e}_{r,n}^2(CF)], \quad (67)$$

where the expression of the constant R is given by:

$$R^2 = \frac{E[a_n^4]}{E[a_n^2]}. \quad (68)$$

Comparing the two cost functions in equations (66) and (67) it can be observed that errors have different interpretations for the LMS algorithm and the MMA algorithm.

In the LMS algorithm, the error $e_{r,n}(LMS)$ is defined as $$e_{r,n}(LMS) = y_n - a_n; \quad (69)$$

and taps are updated in the opposite direction of the gradient:

$$c_{n+1} = c_n - \mu e_{r,n}(LMS) r_n = c_n - \mu (y_n - a_n) r_n. \quad (70)$$

When $y_n$ and $a_n$ represent the input and output of a slicer, the LMS-based error used during tap updating is equivalent to the error measured at the slicer and is a well-defined quantity. As such, an equalizer can converge to optimal solutions when errors are directly calculated with respect to the inputs and outputs of the slicer.

In contrast, in the MMA algorithm the error $e_{r,n}(CF)$ is defined differently. It should be noted that since the LMS algorithm uses second-order statistics of the signals, whereas MMA uses fourth-order statistics, a simplified version of the MMA algorithm, with L=1, is used here for comparison purposes. For this one-dimensional MMA the error $e_{r,n}(CF)$ becomes $$e_{r,n}(CF) = |y_n| - R; \quad (71)$$

and the taps of the filter are updated as follows:

$$c_{n+1} = c_n - \mu e_{r,n}(CF) r_n = c_n - \mu (|y_n| - R) r_n. \quad (72)$$

From equation (72), the taps are not exactly updated in the direction of the slicer errors. Instead, error minimization is done with reference to the constant R that has statistical information about the real symbols $a_n$. The occurrence of filter adaptation depends on the occurrence of R, which depends on m. Consequently, the error $e_{r,n}(CF)$ has only a statistical meaning, and an equalizer is not always guaranteed to converge to optimal solutions in terms of mean-square error (MSE).

If a blind equalization algorithm is not optimum, then $CF \ne 0$ when an equalizer has converged. That is, residual values of the cost function exist. Illustratively, the MMA algorithm is examined to explore what are the residual values of the cost fanction CF.

For a blind start-up with a perfect convergence, $y_n \to a_n$. Consequently, the cost function CF converges to $CF_{an}$:

$$CF = E[(y_n^2 - R^2)^2] \to CF_{an} = E[(a_n^2 - R^2)^2]. \quad (73)$$

This cost function $CF_{an}$ is expanded and simplified as follows:

$$CF_{an} = E[(a_n^2 - R^2)^2] \quad (74a)$$

$$= E[a_n^4 - 2a_n^2 R^2 + R^4] \quad (74b)$$

$$= E\left[a_n^4 - 2a_n^2 \frac{E[a_n^4]}{E[a_n^2]} + R^4\right] \quad (74c)$$

$$= E[a_n^4] - 2E[a_n^2]\frac{E[a_n^4]}{E[a_n^2]} + R^4 \quad (74d)$$

$$= R^4 - E[a_n^4] \quad (74e)$$

$$= \frac{E^2[a_n^4]}{E^2[a_n^2]} - E[a_n^4]. \quad (74f)$$

It should be noted that only analysis for the in-phase dimension is provided, and that the same analysis applies to the quadrature phase dimension. The cost function can be expressed as a function of the number of symbol levels m.

From the above description of the calculations of "Moments of Data Symbols," the constant R is given by:

$$R^2 = \frac{12m^2 - 7}{5}, \tag{75}$$

and the fourth moment of the symbols $a_n$ is given by:

$$E[a_n^4] = \frac{1}{15}(4m^2 - 1)(12m^2 - 7). \tag{76}$$

Then the cost function $CF_{an}$ can be rewritten as:

$$CF_{an} = R^4 - E[a_n^4] \tag{77}$$

$$= \left(\frac{12m^2 - 7}{5}\right)^2 - \frac{1}{15}(4m^2 - 1)(12m^2 - 7) \tag{78}$$

$$= \frac{16}{75}(12m^2 - 7)(m^2 - 1) \tag{79}$$

$$= \frac{16}{75}(12m^4 - 19m^2 + 7). \tag{80}$$

Equation (80) gives a simple way to express the cost function after convergence, and steady-state values of the cost function $CF_{an}$ can be easily calculated. The number of symbol levels m (in magnitude) can be computed from the number of constellation points C for C-CAP:

$$m = \frac{\sqrt{C}}{2}. \tag{81}$$

From equation (80), illustrative calculated values for several CAP systems are provided in the table shown in FIG. 21. As can be observed from this table, the optimum convergence for a blind equalizer can only be achieved for 4-CAP with m=1. Further, residual values of the cost function $CF_{an}$ significantly increase with increasing m. Ultimately, due to large values of the number m, residual values of $CF_{an}$ become so large that a blind equalizer fails to converge.

A Generalized Multimodulus Algorithm (GMMA)

In light of the above, a blind equalization algorithm is adapted to improve performance in systems using higher numbers of symbol levels. In particular, a cost function for adapting an equalizer is modified as a function of the region of the signal space within which the equalizer output samples fall. In an embodiment of the invention, a receiver uses a signal point constellation representing 256 levels. This signal space is divided into sample subsets. Cost ftmction minimization is done with respect to each sample subset for the MMA algorithm. This is a generalized form of the MMA algorithm, referred to herein as GMMA (described further below).

As described earlier, MMA minimizes the dispersion of the equalizer's output samples $y_n$ around piecewise linear contours. The general form of the MMA cost function for L=2 is given by:

$$CF = E[(y_n^2 - R^2(y_n))^2] \tag{82}$$

where values of $R(y_n)$ are determined by the distribution function of the samples $y_n$. For square constellations, R becomes a single constant (e.g., see FIG. 10). For nonsquare constellations, however, $R(y_n)$ takes multiple values that depend on the number of sets of symbols $a_n$ with different statistics. For example, as shown in FIGS. 13 and 14, for a 128-CAP, the symbols are transmitted in two sets, whose values are given by $a_1 = \{\pm 1, \pm 3, \pm 5, \pm 7\}$ and $a_2 = \{\pm 9, \pm 11\}$. Two constants $R_1$ and $R_2$ are necessary because the sets of symbols $a_{1,n}$ and $a_{2,n}$ have different probability distributions. The use of multiple moduli leads to a reduction of the number of wrong solutions. Particularly, the probability of creating the 144-point solution for 128-CAP is significantly reduced when two moduli R are used.

The difficulty with using single contours is that the correction terms used in the tap updating algorithms become very large compared to the spacing between adjacent symbols. As a result, it becomes increasingly difficult to open the eye when the number m of symbol levels increases. For very large values of m, opening of the eye would require such a small step size that the convergence time would be unacceptable.

Therefore, and in accordance with the inventive concept, mninimizing the dispersion of subsets of equalizer output samples $y_n$ around several contours minimizes the maximum values that can be assumed by the correction terms in the tap updating algorithms. This facilitates the opening of the eye.

In support of the inventive concept, the notion of a sample subset is defined as:

$$y_n = \{y_{n,i}\} \; i=1, \ldots, I, \tag{83}$$

where I<m. The cost function minimization is done with respect to each sample subset $y_{n,i}$:

$$CF = \frac{1}{I}\sum_{i=1}^{I} CF_i = \frac{1}{I}\sum_{i=1}^{I} E[(y_{n,i}^2 - R_i^2)^2]. \tag{84}$$

The cost function is reduced to the cost functions $CF_i$ corresponding to the sample subset $y_{n,i}$. When an equalizer converges, $y_n \to a_n$, or, in terms of sample subset, we have $\{y_{n,i}\} \to \{a_{n,i}\}$. The minimum of the cost function in equation (84) is given by:

$$CF_{an} = \frac{1}{I}\sum_{i=1}^{I} CF_{an,i} = \frac{1}{I}\sum_{i=1}^{I} E[(a_{n,i}^2 - R_i^2)^2], \tag{85}$$

when the outputs of the equalizer have converged to constellation points $a_{n,i}$. In this case, the constant $R_i$ corresponds to the set of symbols $a_{n,i}$, and the highest symbol level in subset $a_{n,i}$ is defined as $2m_i-1$.

When using sample subsets, the overall system performance is determined by the individual performance for each sample subset, so that a performance criterion is required for the system. An equal cost function minimization procedure is used such that the cost functions $CF_{an,i}$ are minimized in such a way that the residual value of each $CF_{an,i}$ is reduced to the same amount. With equal cost function minimization:

$$CF_{an,i} = C \tag{86}$$

where C is a suitably chosen constant. With GMMA, the equalizer tries to reduce the residual value of the cost function in order to achieve a good performance of the eye opening.

Design of Subset Samples for GMMA

In contrast to MMA, which only requires the determination of one constant R for a given square constellation, several parameters are needed to describe sample subsets in GMMA. In addition, it should be noted that the sample subsets $y_{n,i}$ are undefined at the beginning of the cost function minimization procedure. As such, a numerical solution cannot be easily derived. However, we have shown that cost functions can be expressed as a function of the number m. Therefore, the cost function $CF_{an,i}$ can also be expressed as a function of $m_i$. With one unknown $m_i$, the cost function $CF_{an,i}=C$ can be numerically solved. Other parameters can be solved as well if they can be expressed as a function of $m_i$.

In summary, $m_i$ is the fundamental parameter in the overall system design for GMMA because it can be directly derived for a given cost function. An iterative algorithm is used for calculating $m_i$ (described below). After $m_i$ is derived, other parameters can be derived as a function of $m_i$.

Figures 22, 23:
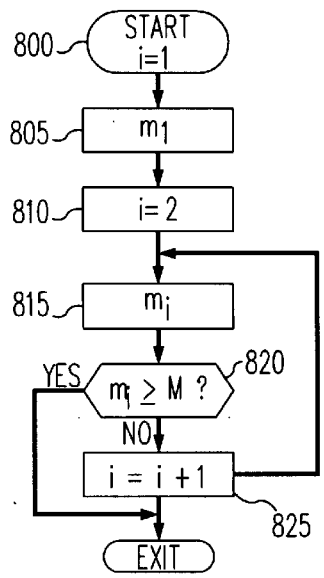
FIG. 22 graphically depicts a set of illustrative GMMA parameters for defining symbol subsets.
FIG. 23 shows an illustrative flow chart for determining a value for the parameter $m_i$.

An illustrative set of three parameters for GMMA is shown in FIG. 22. These parameters are $m_{si}$, $w_i$, and $R_i$. The latter term, $R_i$, is calculated as described above once $m_i$ is defined. The other parameters are defined as follows:

$$m_{si}=m_i-m_{i-1}, \tag{87}$$

where $m_{si}$ is the number of symbol levels for each sample subset $y_{n,i}$.

$$w_i=2m_i, \tag{88}$$

where $w_i$ is a sample boundary. It should be noted that when $w_i$ is defined, the sample subset $y_{n,i}$ is described as:

$$w_{i-1} \leq |y_{n,i}| \leq w_i. \tag{89}$$

Consequently, the symbol subset $a_{n,i}$ is described as:

$$w_{i-1} \leq |a_{n,i}| < w_i, \tag{90}$$

As shown in FIG. 22, $w_i$ and $w_{i-1}$ are represented as two dashed lines and $R_i$ for sample subset $y_{n,i}$ is shown as a solid line.

An iterative algorithm for calculating $m_i$ is shown in FIG. 23. The calculation of $m_i$ starts with i=1 (in step 800) and $m_i$ is then calculated in an iterative fashion (in step 805 (for i=1) and step 815 (for i≠1)). The program terminates when the condition $m_i \geq M$ is satisfied (in step 820). Illustratively, this flowchart will be described in the context of 256-CAP. In this example, the number of symbol levels is given by m=8, and the residual values of the cost function $CF_{an}$ in dB is assumed to be $C_{dB}=28$ dB. The number $C_{dB}=28$ dB refers to the residual values of $CF_{an}$ required in MMA for 64-CAP.

The calculation of $m_i$ starts in step 800 with i=1. The value for $m_1$ is calculated in step 805. When the index i is equal to one, the calculation of $m_i$ is simple. The cost function $CF_{an,1}$ as a function of $m_1$ is given by:

$$CF_{an,1} = E[(a_{n,1}^2 - R_1^2)^2] = \frac{16}{75}(12m_1^4 - 19m_1^2 + 7). \tag{91}$$

In this design, it is assumed that C=28 dB. Setting $CF_{an,1}=C$, one positive solution is obtained, i.e., $m_1=4$. (Note that the constant C is in logarithm scale and first needs to be converted to linear scale. Also, normally the solution is not an integer. As such, an integer solution is obtained by rounding the number $m_i$.)

For the corresponding sample subset $y_{n,1}$, the number of symbol levels $m_{s1}$ is given by:

$$m_{si}=m_i \rightarrow m_1=4 \tag{92}$$

The sample boundary $w_1$ is then computed as:

$$w_1=2m_1=2*4=8. \tag{93}$$

For this value of $w_1$, the samples $y_{n,1}$ are described as:

$$0 \leq |y_{n,1}| \leq 8. \tag{94}$$

Correspondingly, the symbols $a_{n,1}$ are restricted to:

$$a_{n,1}=\{\pm1,\pm3,\pm5,\pm7\}. \tag{95}$$

The constant $R_1$ is computed from:

$$R_1^2 = \frac{E[a_{n1}^4]}{E[a_{n1}^2]} = \frac{12m_1^2 - 7}{5} = 37 \rightarrow R_1 \approx 6. \tag{96}$$

For sample subset $y_{n,1}$, the equalizer minimizes the dispersion of the samples around the constant $R_1 \approx 6$ when the equalizer output samples $0 \leq |y_{n,1}| \leq 8$ are used during the filter adaptation.

The above described the derivation for i=1. For i≠1, the cost function $CF_{an,i}$ is written as:

$$CF_{an,i}=E[(a^2_{n,i}-R^2_i)^2]=R^4_i-E[a^4_{n,i}]. \tag{97}$$

To compute $CF_{an,i}$, both $R_i$ and $a_{n,i}$ must be determined as a function of $m_i$. It should be noted that the initial index of $a_{n,i}$ does not start with one. Therefore, $E[a^4_{n,i}]$ is rewritten as follows:

$$E[a_{n,i}^4] = \frac{1}{m_{si}}\left(\sum_{n=1}^{m_i} a_n^4 - \sum_{n=1}^{m_{i-1}} a_n^4\right), \tag{98}$$

where $m_{si}=m_i-m_{i-1}$. Then $a_{n,i}$ in m becomes:

$$E[a_{n,i}^4] = \frac{1}{15m_{si}}[m_i(48m_i^4 - 40m_i^2 + 7) - m_{i-1}(40m_{i-1}^4 - 40m_{i-1}^2 + 7)], \tag{99}$$

and the constant $R_i$ is given by:

$$R_i^2 = \frac{E[a_{n,i}^4]}{E[a_{n,i}^2]} = \frac{12}{5}(m_i^2 - m_{i-1}^2). \tag{100}$$

Substituting $R^2_i$ and $E[a^4_{n,i}]$ into the cost function $CF_{a,i}$, the following results:

$$CF_{an,i} = R_i^4 - E[a_{n,i}^4], \tag{101}$$

$$= \left(\frac{12}{5}(m_i^2 - m_{i-1}^2)\right)^2 - \tag{102}$$

$$\frac{1}{15m}[m_i(48m_i^4 - 40m_i^2 + 7) - m_{i-1}(40m_{i-1}^4 - 40_{m-1}^2 + 7)]$$

$$= \frac{64}{25}(m_i^4 - m_{i-1}^4) - \frac{368}{25}m_i^2 m_{i-1}^2 - \tag{103}$$

$$\frac{16}{5}m_i m_{i-1}(m_i^2 - m_{i-1}^2) + \frac{8}{3}(m_i^2 + m_i m_{i-1} + m_{i-1}^2) - \frac{7}{15}.$$

In the iterative algorithm, $m_{i-1}$ is known, and $m_i$ is unknown. Therefore, only one variable is unknown for the equation $CF_{a,i}=C$, so that the equation can be uniquely solved. For i=2 and $m_i=4$, the positive integer solution $m_2=6$ is obtained in step 815. The following is the calculation of the number $m_{si}$ for i=2:

$$m_{s2}=m_2-m_1 \to m_{s2}=m_2-m_1=6-4=2. \quad (104)$$

The sample boundary is given by:

$$w_i=2m_2=2*6=12. \quad (105)$$

With $w_{i-1}=8$, the sample subset $y_{n,2}$ is defined by:

$$8 \leq |y_{n,2}| \leq 12 \quad (106)$$

For the symbol subset $a_{n,2}$, two symbol levels are included:

$$a_{n,2}=\{\pm 9, \pm 11\}. \quad (107)$$

With known $m_i$ and $m_{i-1}$, the constant $R_i$ is computed. For $i=2$, $$R_2^2 = \frac{12}{5}(m_2^2 - m_1^2) = \frac{12}{5}(6^2 - 4^2) = 105 \to R_2 = 10.25. \quad (108)$$

For sample set $y_{n,2}$, the equalizer minimizes the dispersion around the constant $R_2=10.25$ when the samples are restricted to $8 \leq |y_{n,2}| \leq 12$.

In step 820, the conditional equation $m_i \geq M$ is tested. For $i=2$ and $M=8$, the condition is not satisfied since $m_2=6$, which is less than M. Thus, the index counter is incremented in step 825, with $i=i+1=3$, and the program returns to step 815. Repeating the calculations in step 815 for $i=3$, the following values are obtained: $m_3=8$, $m_{s3}=2$, $w_3=16$ and $R_3=14.17$. Therefore, samples $y_{n,3}$ are defined as:

$$12 \leq |y_{n,1}| < \infty \quad (109)$$

and two symbol levels are included in $a_{n,3}$:

$$a_{n,3}=\{\pm 13, \pm 15\}. \quad (110)$$

For the sample subset $y_{n,3}$, the equalizer minimizes the dispersion around $R_3=14.17$ when samples $12 \leq |y_{n,2}| \leq \infty$ are used during the tap updating.

The conditional equation $m_i \geq M$ is satisfied with $m_3=8$, so that the iterative algorithm for 256-CAP is terminated for $i=3$.

This completes the parameter calculation of GMMA for 256-CAP. To satisfy the equal cost function minimization, a total of three data subsets is required, as shown in FIG. 24. In this figure, three data subsets are divided by the dashed lines $w_i$, and three moduli $R_i$ are represented by solid lines. The equalizer minimizes the dispersion to three moduli respectively during filter adaptation.

Summary of GMMA

The important feature of GMMA is that multiple moduli are employed. However, to satisfy the requirement of reducing wrong decisions, at least two symbol levels need to be included in each symbol subset. Experimental simulations show that suitable residual values of the cost function for GMMA are in the 30–40 dB range. The requirements for the number of symbol levels and minimum residual values cannot both be satisfied when the number of symbol levels goes beyond certain values. For instance, for 1,024 CAP with m=16, we set $CF_{an,i}=35$ dB. We need to divide the symbols into six subsets.

$$a_1=\{\pm 11, \ldots \pm 1\} \; a_2=\{\pm 13, \ldots \pm 17\} \; a_3=\{\pm 19, \pm 21\} \quad (111)$$

$$a_4=\{\pm 23, \pm 25\} \; a_5=\{\pm 27, \pm 29\} \; a_6=\{\pm 31\}. \quad (112)$$

There are too many symbol subsets with a small number of symbols (e.g., $a_3$–$a_6$). As a result, the blind algorithm uses too many wrong correction terms during tap adaptation and loses its effectiveness.

Figure 11:
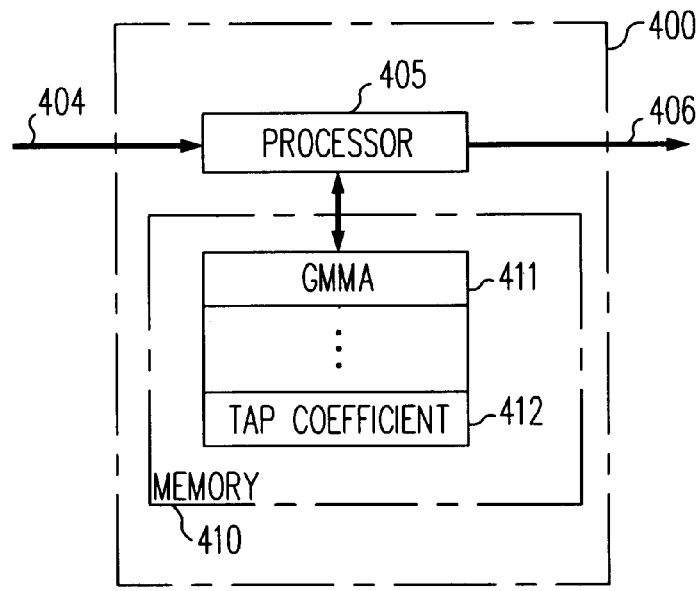
FIGS. 11 and 12 are illustrative block diagrams of a portion of a receiver embodying the principles of the invention.
Figure 12:
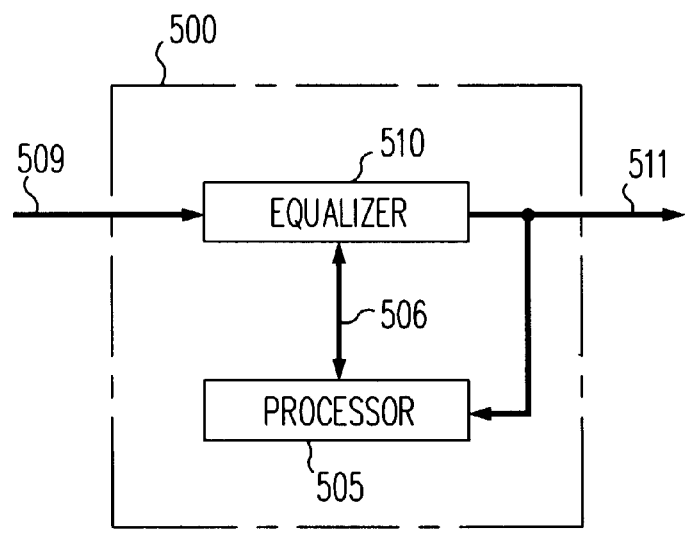

Illustrative embodiments of the inventive concept are shown in FIGS. 11 and 12. FIG. 11 illustrates an embodiment representative of a digital signal processor 400 that is programmed to implement an FSLE in accordance with the principles of the invention. Digital signal processor 400 comprises a central processing unit (processor) 405 and memory 410. A portion of memory 410 is used to store program instructions that, when executed by processor 405, implement the GMMA type algorithm. This portion of memory is shown as 411. Another portion of memory, 412, is used to store tap coefficient values that are updated by processor 405 in accordance with the inventive concept. It is assumed that a received signal 404 is applied to processor 405, which equalizes this signal in accordance with the inventive concept to provide an output signal 406. For the purposes of example only, it is assumed that output signal 406 represents a sequence of output samples of an equalizer. (As known in the art, a digital signal processor may, additionally, further process received signal 404 before deriving output signal 406.) An illustrative software program is not described herein since, after learning of the GMMA type algorithms as described herein, such a program is within the capability of one skilled in the art. Also, it should be noted that any equalizer structures, such as those described earlier, can be implemented by digital signal processor 400 in accordance with the inventive concept.

FIG. 12 illustrates another alternative embodiment of the inventive concept. Circuitry 500 comprises a central processing unit (processor) 505, and an equalizer 510. The latter is illustratively assumed to be a phase-splitting FSLE as described above. It is assumed that equalizer 510 includes at least one tap-coefficient register for storing values for corresponding tap coefficient vectors (e.g., as shown in FIG. 3). Processor 505 includes memory, not shown, similar to memory 410 of FIG. 11 for implementing the GMMA type algorithms. Equalizer output signal 511, which represents a sequence of equalizer output samples, is applied to processor 505. The latter analyzes equalizer output signal 511, in accordance with the inventive concept, to adapt values of the tap coefficients in such a way as to converge to a correct solution.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an equalizer, etc., the functions of any one or more of those building blocks can be carried out using one or more appropriate programmed processors.

In addition, although the inventive concept was described in the context of an FSLE, the inventive concept is applicable to other forms of adaptive filters, such as, but not limited to, a decision feedback equalizer (DFE). The inventive concept is applicable to all forms of communications systems, e.g., broadcast networks, e.g., high-definition television (HDTV), point-to-multipoint netowrks, like fiber to the curb (mentioned above), signal identification or classification applications, like wire-tapping, etc.

What is claimed:

1. An improved equalizer for use in a receiver for performing equalization, the improvement comprising:

a processor that adapts coefficients of the equalizer by minimizing a cost function with respect to each one of a number of sample subsets, where each sample subset represents a region of a signal space, where a modulus of said cost function varies by region and where the minimization is performed such that values of the minimized cost function for the different regions are approximately the same.

2. The improved equalizer of claim 1 wherein the processor is a digital signal processor.

3. The improved equalizer of claim 1 wherein the processor adapts the coefficients of the equalizer in accordance with a multimodulus-based cost function.

4. An improved equalizer for use in a receiver for performing equalization; the improvement comprising:

a processor a) for providing an equalizer function for equalizing a received signal wherein a signal space is divided into a plurality of regions, each region having its own cost function whose modulus is a function of symbol statistics within this region, and b) for adapting coefficients of the equalizer function by using the respective cost function and associated modulus of that region into which output samples of the equalizer fall.

5. The improved equalizer of claim 4 wherein the processor is a digital signal processor.

6. A method for use in a communications receiver, the method comprising the steps of:

partitioning a signal space into a plurality of regions, each region associated with a sample subset of equalizer output values;

minimizing a cost function with respect to each sample subset for converging the equalizer, said cost function having a modulus that varies by region, such that values of the minimized cost function for the different regions are approximately the same.

7. A method for use in a communications receiver, the method comprising the steps of:

dividing a signal space into a plurality of regions, each region having its own cost function whose modulus is a function of symbol statistics within this region;

using an adaptive filter structure for processing an input signal to form a plurality of output samples, the adaptive filter structure including a corresponding set of tap coefficient values and the output samples having associated coordinate values in the signal space; and converging the set of tap coefficient values as a function of the coordinate values of the output samples and the modulus of their associated region.

8. The method of claim 7 wherein once the converging step achieves a predefined error rate, the method includes the step of using a least-mean-square-based cost function for final equalizer convergence.

9. Apparatus for use in performing blind equalization in a receiver, the apparatus comprising:

a memory for storing a convergence algorithm and for storing a set of tap coefficient values; and a processor a) for filtering an input signal as a function of the set of stored tap coefficient values to provide output samples, each output sample having coordinate values in a signal space that is further divided into regions, each region having its own cost function whose modulus is a function of the statistics of the symbols within this region, and b) for executing the convergence algorithm to adapt the set of stored tap coefficient values as a function of i) values of the output samples and ii) the modulus of that region of the signal space into which the coordinate values of the output samples fall.

10. The apparatus of claim 9 wherein the convergence algorithm minimizes a cost function with respect to each region of the signal space.

11. Apparatus for use in a receiver, the apparatus comprising:

an equalizer having a set of tap coefficient values and for providing an equalized version of an applied input signal represented by a plurality of output samples, each output sample being associated with a region of a signal space; and a processor for adapting the set of tap coefficients by using a cost function that is modified as a function of each region of the signal space within which each output sample falls and wherein the minimization is performed such that values of the minimized cost function for the different regions are approximately the same.

* * * * *